US012790795B2

(12) United States Patent
Li et al.

(10) Patent No.: US 12,790,795 B2
(45) Date of Patent: Nov. 10, 2026

(54) ATMOSPHERIC WATER HARVESTING COMPOSITE FOAMS, AND SYSTEMS AND METHODS FOR FABRICATION AND USE THEREOF

(71) Applicant: UNIVERSITY OF MARYLAND, COLLEGE PARK, College Park, MD (US)

(72) Inventors: Teng Li, Potomac, MD (US); Bo Chen, College Park, MD (US); Shuangshuang Jing, Hyattsville, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 326 days.

(21) Appl. No.: 18/543,576

(22) Filed: Dec. 18, 2023

(65) Prior Publication Data

US 2024/0200310 A1 Jun. 20, 2024

Related U.S. Application Data

(60) Provisional application No. 63/387,899, filed on Dec. 16, 2022.

(51) Int. Cl.
*B01D 53/26* (2006.01)
*B01D 53/28* (2006.01)
*E03B 3/28* (2006.01)

(52) U.S. Cl.
CPC ................ *E03B 3/28* (2013.01); *B01D 53/26* (2013.01); *B01D 53/261* (2013.01); *B01D 53/263* (2013.01); *B01D 53/28* (2013.01); *B01D 2257/80* (2013.01)

(58) Field of Classification Search
CPC ....... B01D 53/26; B01D 53/261; B01D 53/28
See application file for complete search history.

(56) References Cited

U.S. PATENT DOCUMENTS 6,235,219 B1 * 5/2001 Beckenhauer ....... B01D 53/261 252/194
2021/0078864 A1 3/2021 Hu et al.
2023/0304270 A1 9/2023 Friesen et al.

OTHER PUBLICATIONS

Chen et al., "All-natural, eco-friendly composite foam for highly efficient atmospheric water harvesting," *Nano Energy*, Mar. 2023, 110: 108371. (10 pages).

Zhang et al., "Super hygroscopic nanofibrous membrane-based moisture pump for solar-driven indoor dehumidification," *Nature Communications*, Jul. 2020, 11: 3302. (11 pages).

* cited by examiner

*Primary Examiner* — Robert A Hopkins
(74) *Attorney, Agent, or Firm* — RowanTree Law Group, PLLC; Frederick F. Rosenberger

(57) ABSTRACT

A system can employ an atmospheric water harvesting (AWH) composite. The AWH composite can include a foam and a plurality of deliquescent particles. The foam can include an organic polymer. The foam can have pore size of at least 1 μm. The deliquescent particles can be disposed on internal surfaces of the foam. The deliquescent particles can be formed of one or more hygroscopic materials. In operation, the AWH composite can be provided in an atmosphere having a relative humidity, such that water in the atmosphere is captured by the AWH composite. The captured water can be released by heating the AWH composite.

20 Claims, 14 Drawing Sheets
(9 of 14 Drawing Sheet(s) Filed in Color)

ATMOSPHERIC WATER HARVESTING COMPOSITE FOAMS, AND SYSTEMS AND METHODS FOR FABRICATION AND USE THEREOF

CROSS-REFERENCE TO RELATED APPLICATIONS

The present application claims the benefit of U.S. Provisional Application No. 63/387,899, filed Dec. 16, 2022, entitled "Eco-Friendly Composite Foam-Based Atmospheric Water Harvesting System," which is hereby incorporated by reference herein in its entirety.

FIELD

The present disclosure relates generally to atmospheric water harvesting, and more particularly, to atmospheric water harvesting composite foams, and systems and methods for fabrication and use thereof.

BACKGROUND

Water scarcity is a growing crisis, with freshwater resources becoming increasingly limited due to population growth and climate change. While traditional desalination technologies exist, they require high energy and often rely on coastal brine resources, limiting their effectiveness in land-locked areas. Atmospheric water harvesting (AWH) offers a promising alternative, tapping into the vast and constantly replenished water vapor present in the air. Various AWH approaches have been explored, including capturing fog and dew, or directly extracting water vapor, using sorbent materials such as silica gels, zeolites, metal-organic frameworks (MOFs), and hygroscopic salts. While these technologies hold potential, challenges remain in terms of efficiency, cost, and scalability. For example, the water capture capacity of silica gels and zeolites is relatively low (e.g., only up to 40% of its weight). Manufacturing of MOFs, which have an atomically-porous powder structure formed of metal ions and organic linkers, can be complicated and can consume large amounts of organic solvents. Hygroscopic salts are likely to liquefy after absorbing moisture from the air, which can lead to loss of the salts via leakage.

Embodiments of the disclosed subject matter may address one or more of the above-noted problems and disadvantages, among other things.

SUMMARY

Embodiments of the disclosed subject matter provide an atmospheric water harvesting (AWH) composite, and systems and methods for operation and use thereof. In some embodiments, deliquescent particles can be provided on internal surfaces of an organic polymer foam with microscale pores, for example, by soaking the foam in a solution containing the deliquescent particles and then drying. This simple fabrication process can yield a stable AWH composite with enhanced water harvesting performance, for example, capable of absorbing at least 100% of its weight in water, a water uptake capacity of at least 0.9 g/g, a water uptake speed of at least 0.2 g/g, and/or a daily water production of at least 1 g/g under arid conditions (e.g., 30% relative humidity). In some embodiments, water can be released by heating the AWH composite to a temperature greater than ambient, for example, using solar radiation and/or electrical heating. In some embodiments, one or more additives can be provided to further enhance performance, for example, carbon-based particles or water-soluble polymer particles. Alternatively or additionally, in some embodiments, part or all of the foam can be carbonized.

In one or more embodiments, a system can comprise an atmospheric water harvesting (AWH) composite. The AWH composite can comprise a foam and a plurality of deliquescent particles. The foam can comprise an organic polymer and can have a pore size of at least 1 μm. The plurality of deliquescent particles can be disposed on internal surfaces of the foam. The plurality of deliquescent particles can be formed of one or more hygroscopic materials.

In one or more embodiments, a method can comprise immersing at least part of a foam in a solution comprising a plurality of deliquescent particles. The plurality of deliquescent particles can be formed of one or more hygroscopic materials. The foam can comprise an organic polymer and can have a pore size of at least 1 μm. The method can further comprise, after the immersing, drying the foam to form an AWH composite. After the drying, the plurality of deliquescent particles can be disposed on the internal surfaces of the foam.

In one or more embodiments, a method can comprise providing an AWH composite in an atmosphere having a relative humidity, such that water in the atmosphere is captured by the AWH composite. The method can further comprise, after the providing, releasing the captured water from the AWH composite by heating the AWH composite. The AWH composite can comprise a foam and plurality of deliquescent particles. The foam can comprise an organic polymer and can have a pore size of at least 1 μm. The plurality of deliquescent particles can be disposed on the internal surfaces of the foam and can be formed of one or more hygroscopic materials.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

General Considerations

Figure 1:
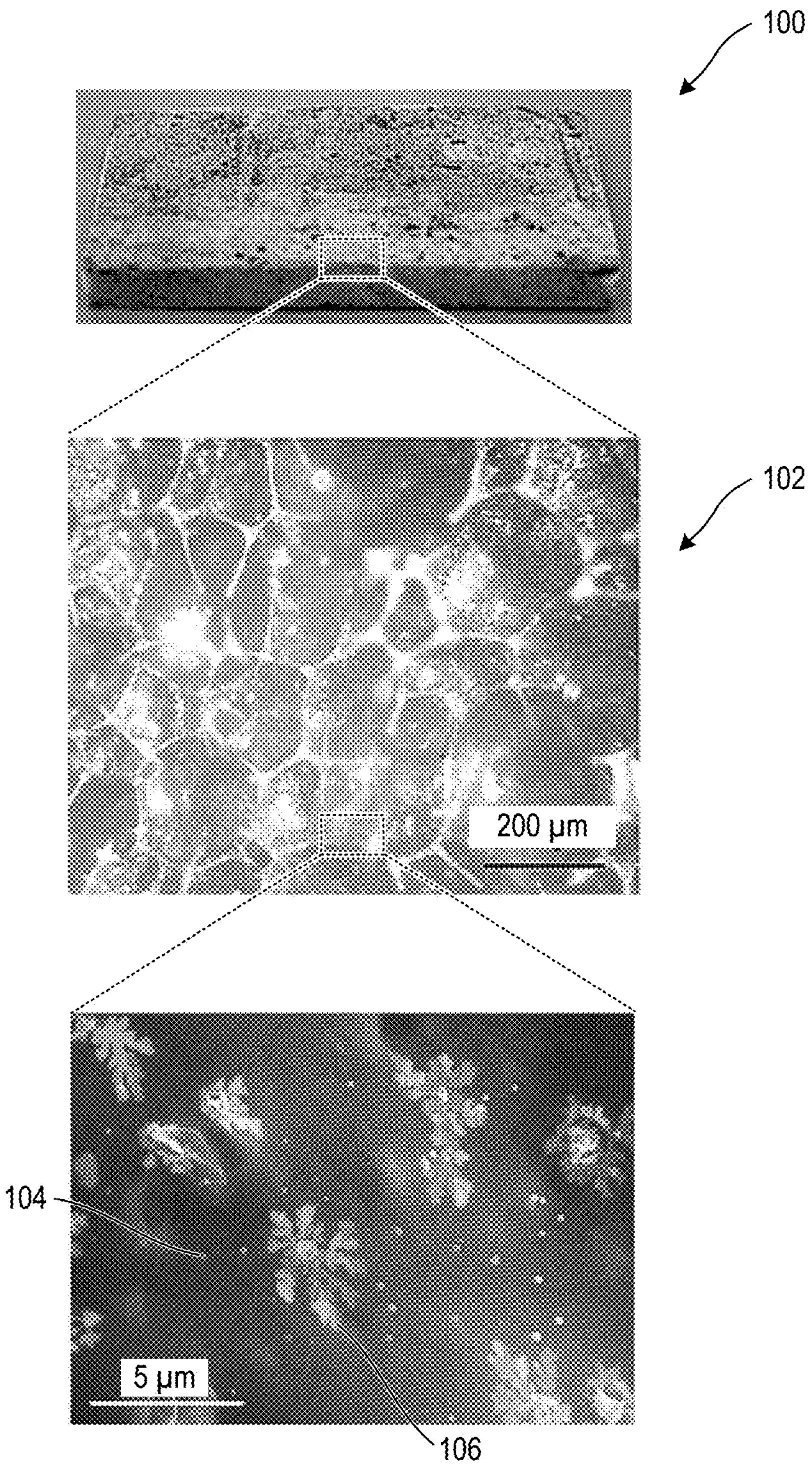
FIG. 1 shows macroscale and microscale images of an atmospheric water harvesting (AWH) composite, according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and sub-combinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one skilled in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person skilled in the art to have a more definitive construction, the numerical parameters set forth are approximations that may depend on the desired properties sought and/or limits of detection under standard test conditions/methods, as known to those skilled in the art. When directly and explicitly distinguishing embodiments from discussed prior art, the embodiment numbers are not approximates unless the word "about," "substantially," or "approximately" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein but are not intended to be limiting. For example, certain terms may be used such as "inner," "outer," "upper," "lower," "top," "bottom," "interior," "exterior," "left," "right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part, and the object remains the same.

As used herein, "comprising" means "including," and the singular forms "a" or "an" or "the" include plural references unless the context clearly dictates otherwise. The term "or" refers to a single element of stated alternative elements or a combination of two or more elements unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one skilled in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following are provided to facilitate the description of various aspects of the disclosed subject matter and to guide those skilled in the art in the practice of the disclosed subject matter.

Pore size: A cross-sectional dimension (e.g., diameter) of pores (e.g., voids or openings) in a solid material (e.g., foam). In some embodiments, the size of the pores can be measured via imaging, for example, scanning electron microscopy (SEM) imaging of a cross-section of the solid material. In some embodiments, the pore size is a mean value for pores in the cross-section of the solid material. In some embodiments, the pore size is greater than 1 μm, for example, in a range of 25-500 μm, inclusive (e.g., 25-100 μm, inclusive).

Deliquescent material: A material capable of absorbing water from air. In some embodiments, the deliquescent material is in the form of particles, for example, nanoparticles and/or dendritic structures. In some embodiments, the deliquescent material comprises one or more hygroscopic materials (e.g., salt). In some embodiments, one or more hygroscopic materials can comprise a halide, a metal hydroxide, a carbonate, and/or a phosphate. For example, the one or more hygroscopic materials can include any of LiCl, $NH_4Cl$, LiBr, KCl, $CaCl_2$), $MgCl_2$, $CoCl_2$, $ZnCl_2$, $FeCl_3$, $LiNO_3$, $NH_4NO_3$, $NaNO_3$, $KNO_3$, $Cu(NO_3)_2$, $Fe(NO_3)_3$, NaOH, KOH, $Ca(OH)_2$, $K_2CO_3$, $KCl·MgCl_2·6(H_2O)$, and $KH_2PO_4$.

Nanoparticle: A particle formed of one or more elements and having a maximum cross-sectional dimension (e.g., diameter when the particle is spherical) less than or equal to about 1 μm, for example, in a range of 100-500 nm, inclusive. In some embodiments, the nanoparticle is formed of and/or comprises a deliquescent material.

Dendritic structure: A structure having a microscale branching pattern (e.g., tree-like or snowflake). In some embodiments, the dendritic structure has a size (e.g., cross-sectional dimension) of at least 1 μm, for example, about 5 μm. In some embodiments, the dendritic structure is formed of and/or comprises a deliquescent material.

Natural polymer: A polymer derived from an organism, such as a plant, fungus, insect, crustacean, animal, etc. In some embodiments, the natural polymer can include any of cellulose and its derivatives, carboxymethyl cellulose, chitosan and its derivatives, chitin, starch and its derivatives, agar, alginate, pectin, xanthan, guar gum, xanthan gum, carrageenan, hyaluronic acid, albumin, and gum arabic.

Synthetic polymer: A man-made polymer derived from, for example, natural gas or petroleum. In some embodiments, the synthetic polymer can include any of polyvinyl alcohol (PVA), polyurethane (PU), polyphosphate, polyoxazoline, N-(2-Hydroxypropyl) methacrylamide (HPMA), polyacrylamide, polyacrylic acid (PAA), polyvinyl pyrrolidone (PVP), and polyethylene glycol (PEG).

Nanofibrillated cellulose (NFC): Cellulose fibers having a diameter less than or equal to 100 nm and a length greater than or equal to 1 μm. In some embodiments, the cellulose fibers are extracted or derived from a natural cellulose-containing material (e.g., wood, pulp, agricultural waste, etc.), for example, via mechanical and/or chemical disintegration.

Carbonization: Heating of an organic material in the absence of oxygen to convert the material, or at least portions thereof, into carbon.

Carbon-based particle: A particle composed of elemental carbon, for example, any of activated carbon, graphite, graphene, carbon fiber, carbon nanorod, carbon quantum dot, charcoal, carbon nanofiber, carbon nanotube, or carbon black.

Introduction

Disclosed herein are atmospheric water harvesting (AWH) composites, and systems and methods for operation and use thereof. In some embodiments, deliquescent particles can be provided on internal surfaces of an organic polymer foam with microscale pores, for example, by soaking the foam in a solution containing the deliquescent particles and then drying to form an AWH composite 100, as shown in FIG. 1. In some embodiments, one or more additives can be provided to further enhance performance, for example, carbon-based particles or water-soluble polymer particles. Alternatively or additionally, in some embodiments, part or all of the foam can be carbonized.

The highly porous microstructure 102 of the foam 100 can provide a large surface area for doping with the deliquescent particles. In some embodiments, two types of deliquescent material particles are formed on internal surfaces in the AWH composite foam 100, for example, deliquescent nanoparticles 104 (e.g., 100-500 nm in size) and dendritic structures 106 (e.g., about 5-10 μm in size). In some embodiments, the small size of the deliquescent nanoparticles 104 and the dendrite nature of the deliquescent material flakes 106 in the foam can provide a larger specific surface area than that of conventional deliquescent particles (e.g., LiCl spheres of about 50 μm diameter), which can enhance water capture capacity and speed of the AWH composite. As a result, the disclosed AWH composites can exhibit improved water harvesting performance, for example, capable of absorbing at least 100% of their weight in water, water uptake capacities of at least 0.9 g/g, water uptake speeds of at least 0.2 g/g, and/or daily water production of at least 1 g/g under arid conditions (e.g., 30% relative humidity).

AWH Composite Fabrication Methods

Figure 2A:
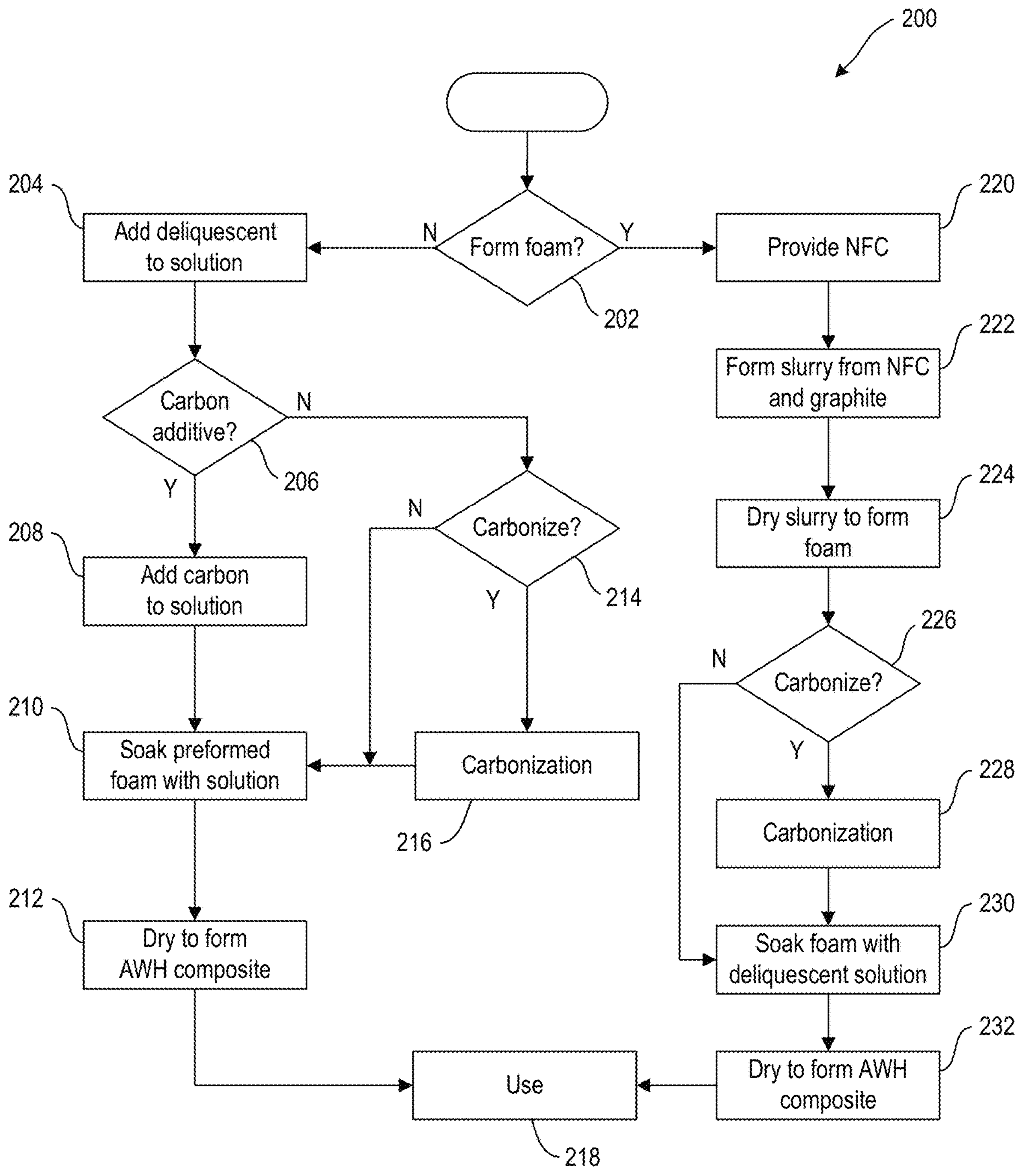
FIG. 2A is a process flow diagram for a method of fabricating an AWH composite, according to one or more embodiments of the disclosed subject matter.

FIG. 2A shows a method 200 for fabricating an AWH composite. The method 200 can initiate at decision block 202, where it is determined if a pre-formed foam should be used for the AWH composite. If a pre-formed foam is to be used, the method 200 can proceed from decision block 202 to process block 204, where one or more deliquescent materials can be added to a solution. In some embodiments, the deliquescent material(s) can be formed of and/or comprise one or more hygroscopic materials, such as a halide, a metal hydroxide, a nitrate, a carbonate, and/or a phosphate. For example, the hygroscopic material(s) can be and/or comprise LiCl, $NH_4Cl$, LiBr, KCl, $CaCl_2$), $MgCl_2$, $CoCl_2$, $ZnCl_2$, $FeCl_3$, $LiNO_3$, $NH_4NO_3$, $NaNO_3$, $KNO_3$, $Cu(NO_3)_2$, $Fe(NO_3)_3$, NaOH, KOH, $Ca(OH)_2$, $K_2CO_3$, $KCl{\cdot}MgCl_2{\cdot}6(H_2O)$, and/or $KH_2PO_4$. In some embodiments, the deliquescent material can be combined with one or more water-soluble polymers in solution. In some embodiments, the water-soluble polymer(s) may already be in solution, and the deliquescent material(s) can be added to the solution. In some embodiments, the water-soluble polymer(s) can be formed of and/or comprises a natural polymer, such as cellulose and its derivatives, carboxymethyl cellulose, chitosan and its derivatives, chitin, starch and its derivatives, agar, alginate, pectin, xanthan, guar gum, xanthan gum, carrageenan, hyaluronic acid, albumin, and/or gum arabic. Alternatively or additionally, in some embodiments, the water-soluble polymer(s) can be formed of and/or comprises a synthetic polymer, such as polyvinyl alcohol (PVA), polyurethane (PU), polyphosphate, polyoxazoline, N-(2-Hydroxypropyl) methacrylamide (HPMA), polyacrylamide, polyacrylic acid (PAA), polyvinyl pyrrolidone (PVP), and polyethylene glycol (PEG).

The method 200 can proceed to decision block 206, where it is determined if carbon particles should be used for the AWH composite. If carbon particles are to be used, the method 200 can proceed from decision block 206 to process block 208, where one or more carbon particles can be added to the solution with deliquescent material(s). For example, the carbon particle(s) can be formed of and/or comprises activated carbon, graphite, graphene, carbon fiber, carbon nanorod, carbon quantum dot, charcoal, carbon nanofiber, carbon nanotube, and/or carbon black.

The method 200 can proceed to process block 210, where all, or at least part, of a preformed foam can be soaked with, immersed in, infiltrated with, sprayed with, or otherwise exposed to the solution having deliquescent material(s). In some embodiments, process block 210 may be performed under vacuum pressure, for example, to encourage the solution to infiltrate the pores and/or channels in the foam. In some embodiments, the preformed foam is formed of and/or comprises one or more organic polymers. For example, the organic polymer(s) can be and/or comprises melamine, polyurethane, neoprene, latex, polypropylene, polyether, polyester, and/or polyethylene. Alternatively, in some embodiments, the preformed foam is formed of and/or comprises NFC and graphite. In some embodiments, the preformed foam has a pore size of at least 1 μm, for example, in a range of 25-500 μm.

The method 200 can proceed to process block 212, where the preformed foam with solution therein (e.g., wet foam) can be dried to form the AWH composite. In some embodiments, the drying is such that a plurality of deliquescent particles become disposed on internal surfaces of the foam, with some of the deliquescent particles being nanoparticles and the remainder forming a dendritic structure having a size greater than 1 μm. In some embodiments, the size of the dendritic structure may be less than (e.g., about d/10) a size of conventional hygroscopic salt particles (e.g., d=50 μm).

In some embodiments, the drying of process block 212 can be via freeze-drying or critical point drying. For example, a freeze-drying process can include reducing a temperature of the wet foam to below a freezing point of the fluid therein (e.g., less than 0° C.), then reducing a pressure to allow the frozen fluid therein to sublime (e.g., less than a few millibars). For example, a critical point drying process can include immersing the wet foam in a fluid (e.g., liquid carbon dioxide), increasing the temperature and pressure of the foam past a critical point of the fluid (e.g., 7.39 MPa, 31.1° C. for carbon dioxide), and then gradually releasing the pressure to remove the now gaseous fluid. Other drying modalities for process block 212 are also possible according to one or more contemplated embodiments, such as but not limited to oven drying and air drying. For example, an oven drying process can include using an oven, hot plate, or other conductive, convective, or radiative heating apparatus to heat the wet foam at an elevated temperature (e.g., greater than 23° C.), for example, 100° C. or greater. For example, an air-drying process can include allowing the wet foam to naturally dry in static or moving air, which air may be at any temperature, such as room temperature (e.g., 23° C.) or at an elevated temperature (e.g., greater than 23° C.).

The method 200 can proceed to process block 218, where the AWH composite can be adapted for or otherwise prepared for use in a particular application. In some embodiments, process block 218 can include assembly of the AWH composite with other system components, for example, a means for releasing captured water from the AWH composite, such as a passive heating mechanism (e.g., via solar irradiation) and/or an active heating mechanism (e.g., electrically-powered heating). Other system components are also possible according to one or more contemplated embodiments.

If it is instead determined at decision block 206 that carbon particles are not to be used for the AWH composite, the method 200 can proceed from decision block 206 to decision block 214, where it is determined if carbonization of the preformed foam is desired. If carbonization is desired, the method 200 can proceed to process block 216, where the preformed foam can be subjected to carbonization (e.g., annealing at 500° C. for 2 hours in an inert atmosphere, such as argon gas). Otherwise, if carbonization was not desired, the method 200 can proceed directly from decision block 214 to process block 210. In some embodiments, the AWH composite may forgo both carbon particles and carbonization, for example, when the AWH composite will be used in a system with an active heating mechanism and/or when the preformed foam has already been carbonized (e.g., pre-carbonized). Alternatively, in some embodiments, the AWH composite may either have carbon particles or be carbonized regardless of the type of heating mechanism employed in the system. After the carbonization of process block 216, or if carbonization was not desired at decision block 214, the method 200 can proceed to process block 210, as described above.

If instead it is determined at decision block 202 that a foam should be formed for the AWH composite, the method 200 can proceed from decision block 202 to process block 220, where nanofibrillated cellulose (NFC) can be provided. In some embodiments, the provision of process block 220 can include fabricating the NFC from a source material (e.g., a biomass, such as cellulosic or wood pulp), for example, via mechanical and/or chemical fibrillation. In some embodiments, the fabrication of the NFC can include (2,2,6,6-tetramethylpiperidine (TEMPO) oxidation. In some embodiments, the fabricated NFC can be subject to size processing to reduce or select for a size of the fibrils, for example, such that each fibril has a diameter less than or equal to 5 nm and a length less than or equal to 600 nm. In some embodiments, the provision of process block 220 can include disposing the NFC in solution, for example, to form a hydrogel.

The method 200 can proceed to process block 222, where the NFC is combined with graphite in solution (e.g., water) to form a slurry. In some embodiments, the NFC and graphite can initially be combined in solution to form a dispersion (e.g., at an NFC:graphite solid mass ratio of about 1:20), and then the dispersion can be subjected to ultrasonication (e.g., at a frequency greater than 20 kHz) to form the slurry. In some embodiments, the graphite can be naturally-occurring crystalline graphite or crystalline graphite that has otherwise not been processed or subject to harsh chemical treatments (e.g., unlike graphene or graphene oxide).

The method 200 can proceed to process block 224, where the graphite-NFC slurry can be dried to form a graphite-NFC foam (GNFC). In some embodiments, the dried foam has a pore size of at least 1 μm, for example, in a range of 25-500 μm (e.g., 25-100 μm). In some embodiments, process block 224 can include disposing the slurry in a desired shape (e.g., mold or cast) prior to and/or during the drying. Such shapes can be substantially planar (e.g., cubic or rectangular prism), curved (e.g., cylindrical or toroidal), or any arbitrary three-dimensional shape. In some embodiments, the drying of process block 224 can be via freeze-drying, for example, where ice crystals can assist in pore formation. Alternatively or additionally, the slurry may include a pore former, which can be removed during the drying or after the drying (e.g., during carbonization of process block 228), thereby leaving behind open pores. Further details regarding a graphite-NFC slurry and forming a foam therefrom can be found in U.S. Patent Application Publication No. 2021/0078864, published Mar. 18, 2021 and entitled "Graphite Materials and Methods for Fabricating and Use Thereof," which is incorporated by reference herein in its entirety. Other drying modalities for process block 224 are also possible according to one or more contemplated embodiments, such as but not limited to critical point drying, oven drying, and/or air drying.

The method 200 can proceed to decision block 226, where it is determined if carbonization of the GNFC foam is desired. In some embodiments, the GNFC foam may forgo carbonization, for example, when the AWH composite will be used in a system with an active heating mechanism. Alternatively, in some embodiments, the AWH composite may be carbonized regardless of the type of heating mechanism employed in the system. If carbonization is desired, the method 200 can proceed to process block 228, where the GNFC foam can be subjected to carbonization (e.g., annealing at 500° C. for 2 hours in an inert atmosphere, such as argon gas), for example, to convert it to carbonized GNFC foam (CGNFC). After carbonization, the CGNFC foam may still have a pore size of at least 1 μm, for example, in a range of 25-500 μm. After the carbonization of process block 216, or if carbonization was not desired at decision block 214, the method 200 can proceed to process block 210, as described above.

After the carbonization of process block 228, or if carbonization was not desired at decision block 226, the method 200 can proceed to process block 230, where all, or at least part, of the foam (GNFC or CGNFC) can be soaked with, immersed in, infiltrated with, sprayed with, or otherwise exposed to a solution having deliquescent material(s). In some embodiments, process block 230 may be performed under vacuum pressure, for example, to encourage the solution to infiltrate the pores and/or channels in the foam.

The method 200 can proceed to process block 232, where the foam (GNFC or CGNFC) with solution therein (e.g., wet foam) can be dried to form the AWH composite. In some embodiments, the drying is such that a plurality of deliquescent particles become disposed on internal surfaces of the foam, with some of the deliquescent particles being nanoparticles and the remainder forming a dendritic structure having a size greater than 1 μm. In some embodiments, the size of the dendritic structure may be less than (e.g., about d/10) a size of conventional hygroscopic salt particles (e.g., d=50 μm). In some embodiments, the drying of process block 232 can be via oven drying. Other drying modalities for process block 232 are also possible according to one or more contemplated embodiments, such as but not limited to air drying, freeze-drying, or critical point drying. After the drying of process block 232, the method 200 can proceed to process block 218, as described above.

Although blocks 202-232 of method 200 have been described as being performed once, in some embodiments, multiple repetitions of a particular process block may be employed before proceeding to the next decision block or process block. In addition, although blocks 202-232 of method 200 have been separately illustrated and described, in some embodiments, process blocks may be combined and performed together (simultaneously or sequentially). Moreover, although FIG. 2A illustrates a particular order for blocks 202-232, embodiments of the disclosed subject matter are not limited thereto. Indeed, in certain embodiments, the blocks may occur in a different order than illustrated or simultaneously with other blocks. In some embodiments, method 200 can include steps or other aspects not specifically illustrated in FIG. 2A. Alternatively or additionally, in some embodiments, method 200 may comprise only some of blocks 202-232 of FIG. 2A.

Figure 2B:
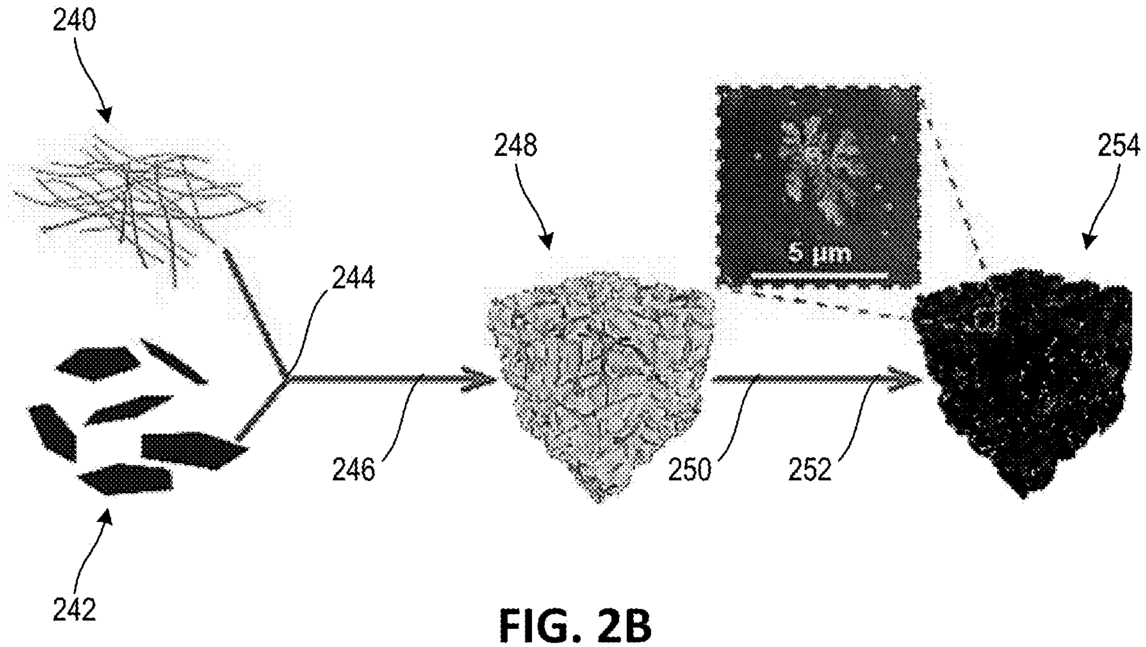
FIG. 2B illustrates aspects of fabricating an AWH composite by forming a foam from nanofibrillated cellulose (NFC) and graphite, according to one or more embodiments of the disclosed subject matter.

FIG. 2B shows a schematic of an exemplary process for fabricating an AWH composite 254. NFC 240 (e.g., with a nanofiber diameter of ~8 nm) can be prepared by an oxidation method from dried pulp. The NFC dispersion and graphite flakes 242 can be mixed by ultrasonication to achieve a homogeneous slurry 244. NFC 240 has hydrophilic functional groups (i.e., hydroxyl groups and carboxyl groups) and a hydrophobic backbone (i.e., C—H moieties). Generally, NFC 240 is negatively charged due to the ionization of functional groups, which can facilitate NFC dispersion in water. Meanwhile, the hydrophobic backbone of the NFC 240 can interact with hydrophobic graphite flakes 242, which can directly assist graphite dispersion and exfoliation in water. The diameter of the graphite flakes reduces from 25-100 μm to 0.5-5 μm after ultrasonication. After ultrasonication, the graphite-NFC (GNFC) slurry 244 can be poured into a mold or cast. The slurry can be frozen, for example, by contacting with liquid nitrogen to form frozen solid blocks 246. The frozen samples can be then freeze-dried using a lyophilizer to yield a GNFC foam 248. During the freezing, the growth of ice crystals can produce numerous pores and/or connected channels within the foam. After freeze-drying, the GNFC foam can be subjected to carbonization, for example, by heating at 500° C. in a tube furnace, to form a carbonized foam 250 (CGNFC). At 252, the CGNFC foam can be immersed in LiCl solution and then dried, for example, via heating in a 105° C. oven, to produce the final AWH composite 254 (e.g., LiCl@CGNFC).

Figure 2C:
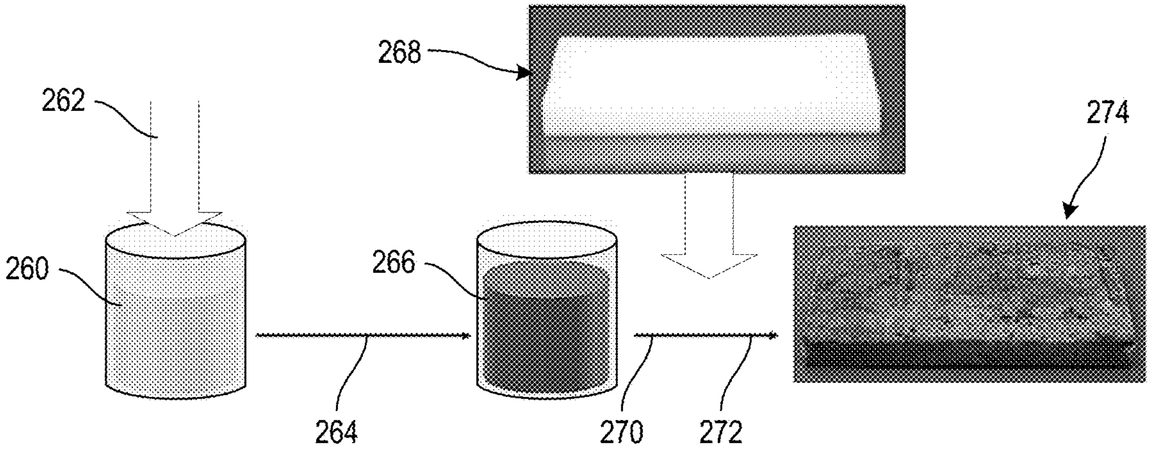
FIG. 2C illustrates aspects of fabricating an AWH composite using a preformed foam, according to one or more embodiments of the disclosed subject matter.

FIG. 2C shows a schematic of another exemplary process for fabricating an AWH composite 274. Commercially-available carbon materials (e.g., activated carbon, graphite, graphene, carbon black, etc.) and deliquescent materials 262 (e.g., LiCl, $CaCl_2$, $MgCl_2$, NaOH, etc.) can be added to a solution 260 of soluble polymers (e.g., PVA, PU, PEG, cellulose, chitosan, etc.) and subjected to ultrasonication at 264 to form a deliquescent-carbon dispersion 266. A preformed porous foam 268 (e.g., melamine, PU, PE, etc.) can be soaked with the dispersion 266 at 270, and the soaked foam can be subjected to drying (e.g., freeze-drying) at 272 to produce the final AWH composite 274.

AWH Methods

Figure 3:
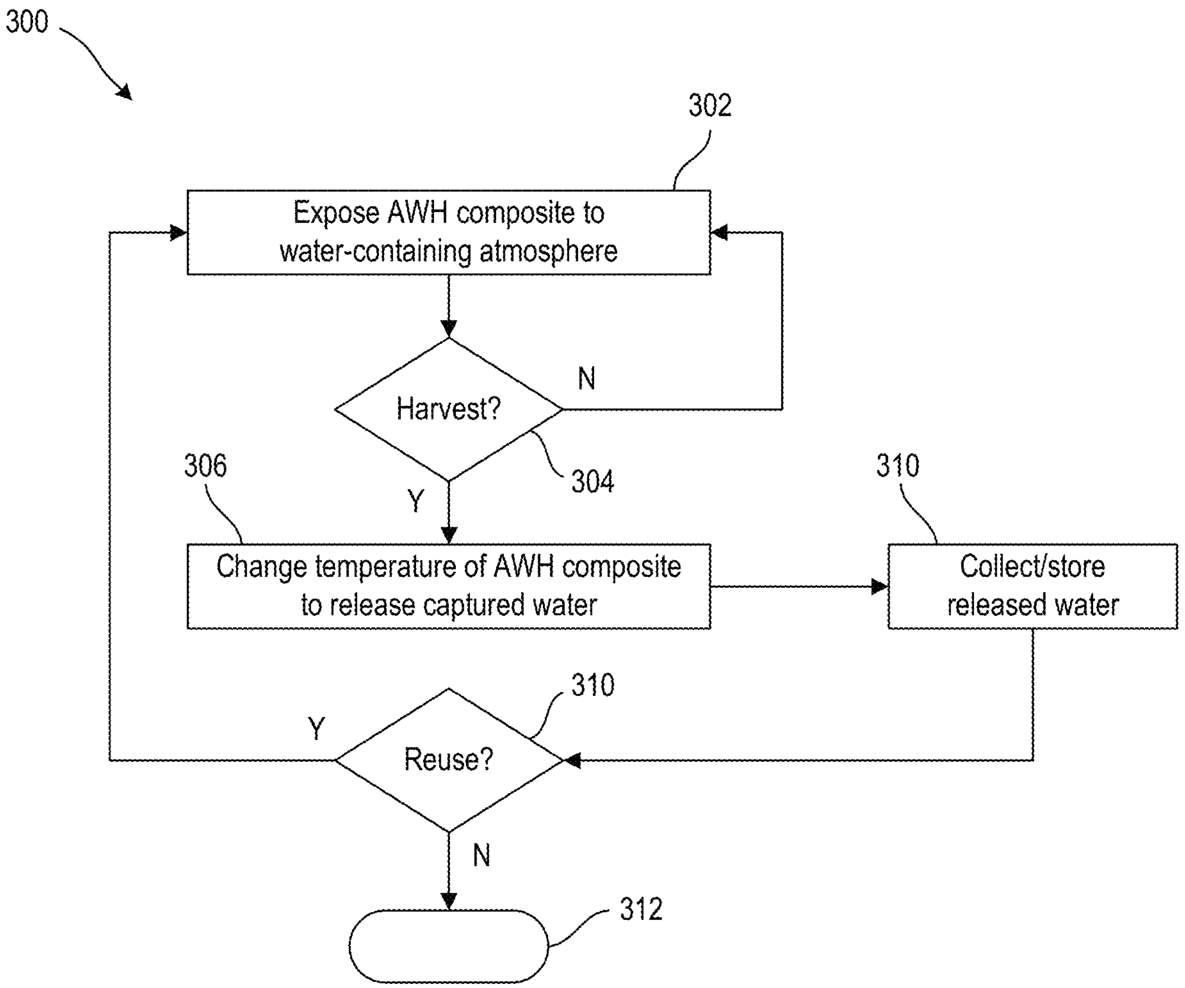
FIG. 3 is a process flow diagram for a method of using an AWH composite, according to one or more embodiments of the disclosed subject matter.

FIG. 3 shows a method 300 for use of an AWH composite in harvesting water from the atmosphere. The method 300 can initiate a process block 302, where an AWH composite (e.g., fabricated according to any of FIGS. 2A-2C) can be exposed to a water-containing atmosphere. In some embodiments, the exposing of process block 302 can include removing the AWH composite from a sealed container, or opening a container or enclosure in which the AWH composite is disposed, so as to allow the atmosphere to interact with the AWH composite. Alternatively or additionally, in some embodiments, the exposing of process block 302 can include conveying the atmosphere to the AWH composite, for example, via ducts, piping, or other air conveying structures. During or at the completion of the exposing of process block 302, the AWH composite may absorb at least 100% of its weight in water (e.g., at 90% relative humidity (RH)), provide a water uptake capacity at saturation of at least 0.9 g/g (e.g., at 30% RH and room temperature (e.g., 20-25° C.)), and/or provide a water uptake speed of at least 0.2 g/g per hour (e.g., at 30% RH and room temperature).

The method 300 can proceed to decision block 304, where it is determined if captured water should be released from the AWH composite. In some embodiments, the decision to release captured water from the AWH composite can be based on a saturation condition of AWH composite, for example, to proceed to release water when the AWH composite is at or close to saturation (i.e. physically unable to capture more water). Alternatively or additionally, in some embodiments, the decision to release captured water from the AWH composite can be based on time, for example, to proceed to release water when the AWH composite has been exposed to atmosphere for a predetermined or desired duration or when another AWH composite has finished releasing water (e.g., when multiple AWH composites are sequentially used to provide a continuous or semi-continuous supply of water). Alternatively or additionally, in some embodiments, the decision to release captured water from the AWH composite can be based on need, for example, to proceed to release water when a user is thirsty or otherwise desires to have water. In one or more contemplated embodiments, the decision to release captured water from the AWH composite can be based on other factors or considerations, alone or in combination with any of those noted above.

If water release is not desired at decision block 304, the method 300 can return to process block 302, where the AWH composite can continue to be exposed to atmosphere. Alternatively, in some embodiments, rather than continuing the atmospheric exposure or proceeding to release water, the AWH composite can be removed from atmosphere and stored in a container, for example, for delayed release of water from the AWH composite. If water release is instead desired, the method can proceed from decision block 304 to process block 306.

At process block 306, the captured water can be released from the AWH composite by changing a temperature thereof, for example, by heating to evaporate the captured water. In some embodiments, the heating can be provided by a passive heating mechanism, for example, solar irradiation directed at and/or concentrated on a surface of the AWH composite, or a surface in thermal communication with the AWH composite, via one or more optical elements (e.g., lens, mirror, grating, heliostat, etc.). Alternatively or additionally, in some embodiments, the heating can be provided by an active heating mechanism, for example, an electrically-powered heating element or heat pump. Other heating mechanisms, such as but not limited to using heat from combustion (e.g., by placing proximal to a fire, such as a campfire, to heat the AWH composite to release water) and/or microwave radiation, are also possible according to one or more contemplated embodiments. In some embodiments, process block 306 can also include moving the AWH composite (e.g., from the atmosphere to a container), configuring a system or device containing the AWH composite for release (e.g., by positioning one or more optical components to direct and/or focus solar radiation onto the AWH composite), or otherwise preparing for water release (e.g., by enclosing the AWH composite within a container).

The method 300 can proceed to process block 308, where the water vapor produced by the heating of process block 306 can be collected and/or stored for use. In some embodiments, a container or enclosure, in which the AWH composite is disposed, can provide the collecting and/or storing, for example, by condensing the water vapor on internal surfaces thereof. Alternatively or additionally, in some embodiments, the water vapor can be conveyed from the AWH composite, for example, a pipe or other conduit to a different component or structure for condensation. Alternatively or additionally, in some embodiments, an active cooling mechanism can be provided to help condense the water vapor released from the AWH composite, for example, a heat exchanger or an electrically-powered refrigeration device, such as a thermoelectric cooler or a heat pump.

After the water is released, the method 300 can proceed to decision block 310, where it is determined if the AWH composite should be reused, in particular, to capture additional water from the atmosphere. If reuse is desired, the method 300 can return to process block 302. In some embodiments, the decision to reuse can include repositioning the AWH composite (e.g., from a release container into the atmosphere) and/or otherwise preparing for water capture (e.g., by removing optical components, terminating heating, and/or allowing the atmosphere to interact with the AWH composite). If reuse is not desired at decision block 310, for example, if a sufficient water supply has already been harvested or is no longer needed (e.g., at the conclusion of a hiking or camping activity), the method 300 can proceed to conclude at terminal block 312.

Although blocks 302-312 of method 300 have been described as being performed once, in some embodiments, multiple repetitions of a particular process block may be employed before proceeding to the next decision block or process block. In addition, although blocks 302-312 of method 300 have been separately illustrated and described, in some embodiments, process blocks may be combined and performed together (simultaneously or sequentially). Moreover, although FIG. 3 illustrates a particular order for blocks 302-312, embodiments of the disclosed subject matter are not limited thereto. Indeed, in certain embodiments, the blocks may occur in a different order than illustrated or simultaneously with other blocks. In some embodiments, method 300 can include steps or other aspects not specifically illustrated in FIG. 3. Alternatively or additionally, in some embodiments, method 300 may comprise only some of blocks 302-312 of FIG. 3.

AWH Systems

Figure 4A:
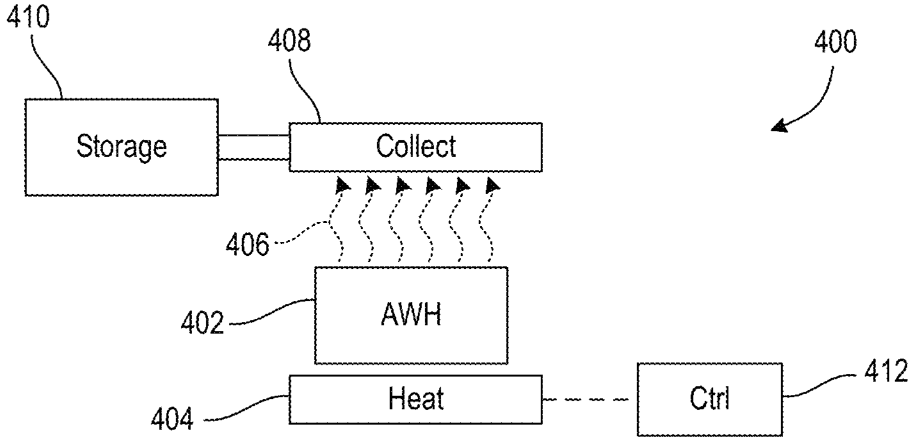
FIG. 4A is a simplified schematic diagram of an AWH system employing a heating system for water release, according to one or more embodiments of the disclosed subject matter.

Referring to FIG. 4A, an AWH system 400 that uses an active heating mechanism for captured water release is shown. In particular, the AWH system 400 can use heating system 404 to heat an AWH composite 402 with captured water therein, so as to generate steam 406. In some embodiments, the heating system 404 can be electrically-powered, for example, an electrical heating element (e.g., Joule heating element or induction heating element), thermoelectric device, or heat pump. In the illustrated example of FIG. 4A, a controller 412 can be operatively connected to and control operation of heating system 404, for example, to activate heating system 404 at appropriate times for water release (e.g., in response to a user request, after a predetermined time of exposure to atmosphere for capture, etc.). In some embodiments, the heating system 404 can be connected to an external power source (e.g., electrical grid, photovoltaic panel, etc.). Alternatively or additionally, in some embodiments, the heating system 404 can have an internal power supply (e.g., primary or secondary battery, fuel cell, etc.). In some embodiments, the AWH system 400, or at least the AWH composite 402, can be configured as a portable element (e.g., capable of being held and transported by a single human).

In the illustrated example of FIG. 4A, the AWH system 400 also includes a collector 408 and a storage volume 410 (e.g., container). The collector 408 can collect the water vapor 406 and can condense it into liquid water, which can then be stored in storage volume 410 for immediate and/or later use. In some embodiments, the functions of the collector 408 and the storage volume 410 may be integrated together, for example, where water vapor condenses on surfaces and is collected within a volume of a single container (e.g., which container can also house the AWH composite). Alternatively or additionally, in some embodiments, the functions performed by the collector 408 can be separated into different components, for example, where a first component (e.g., fume hood) collects the water vapor 406 and a second component (e.g., connected to the first component by one or more fluid conduits) condenses the water vapor 406.

Figure 4B:
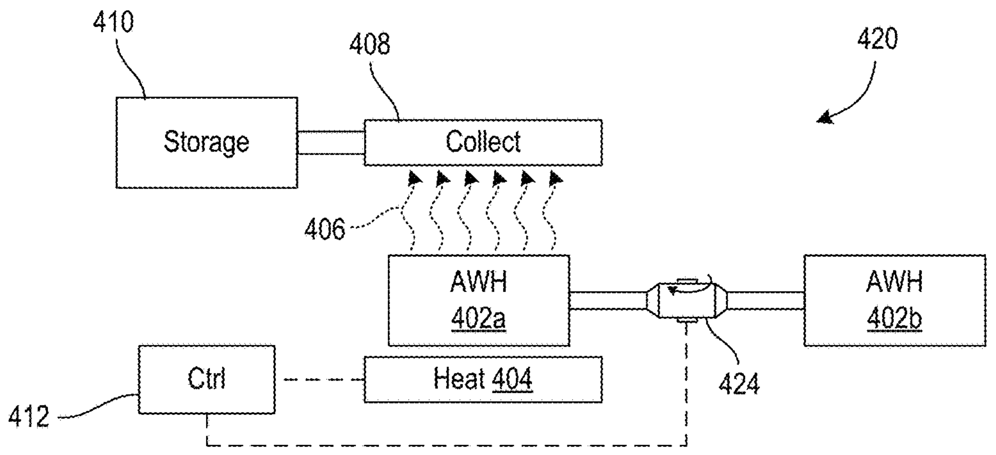
FIG. 4B is a simplified schematic diagram of an AWH system employing multiple AWH composites, according to one or more embodiments of the disclosed subject matter.

Referring to FIG. 4B, another AWH system 420 that uses an active heating mechanism for capture water release is shown. Similar to AWH system 400 of FIG. 4A, AWH system 420 includes a heating system 404, a controller 412 operatively coupled thereto, a collector 408 for collecting water vapor 406, and a storage volume 410. However, AWH system 420 employs multiple AWH composites **402*a*-402*b* and a positioning mechanism 424. In the illustrated example of FIG. 4B, the positioning mechanism 424 arranges the first AWH composite 402*a* in thermal communication with heating system 404, thereby allowing it to operate in water release mode. At a same time, the positioning mechanism 424 arranges the second AWH composite 402*b* in the atmosphere, thereby allowing it to operate in water capture mode. As such, the AWH system 420** can operate to harvest water on a continuous (or at least semi-continuous basis), with one (or more than one) AWH composite capturing water while another AWH composite releases captured water.

In the illustrated example, the positioning mechanism 424 employs rotary displacement (e.g., rotating support, turntable, or carousel) to switch positions of the AWH composites **402*a*, 402*b*. However, other displacement modalities can be employed for the positioning mechanism 424 according to one or more contemplated embodiments, such as but not limited to a robotic arm, a conveyor belt, a spiral conveyor, a bucket elevator, and a vertical belt conveyor. In the illustrated example, the controller 412 is also operatively coupled to the positioning mechanism 424 to control operation thereof, for example, to switch positions, and thus operating modes, of the AWH composites 402*a*, 402*b*. Although only two AWH composites 402*a*, 402*b* are shown in FIG. 4**B, any number of AWH composites is possible according to one or more contemplated embodiments.

Figure 4C:
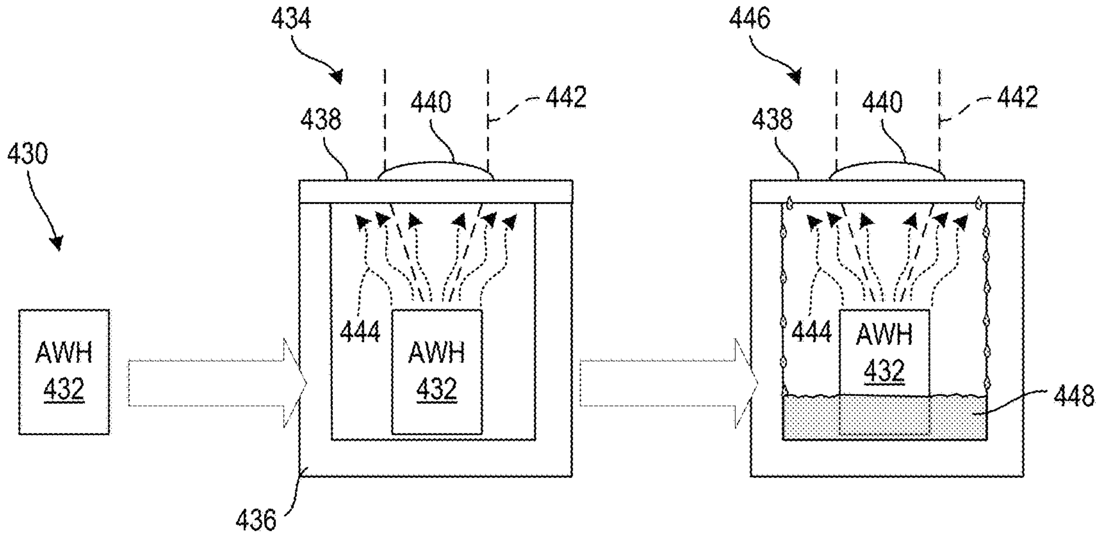
FIG. 4C is a simplified schematic diagram of an AWH system using directed solar radiation for water release, according to one or more embodiments of the disclosed subject matter.

Referring to FIG. 4C, operation of an AWH system that uses a passive heating mechanism for captured water release is shown. During a capture stage 430, an AWH composite 432 can be exposed to atmosphere outside of container 436, for example, by removing the AWH composite 432 from the container 436. Alternatively, in some embodiments, the AWH composite 432 can be retained in the container 436 during the capture stage 430, for example, by removing lid 438 to allow the atmosphere to interact with the AWH composite 432. During the release stage 434, the AWH composite 432 can be placed into the container 436, and the container 436 can be closed by a lid 438. In the illustrated example, the lid 438 can support an optical element 440 (e.g., magnifying lens) thereon, which can be used to direct (e.g., concentrate) solar irradiation 442 onto a top surface of the AWH composite 432, thereby heating the AWH composite 432 and generating steam 444. Alternatively, in some embodiments, the optical element 440 can be provided separate from the lid 438, for example, as a separate component (e.g., when the lid 438 or another part of the container 436 is transparent) or as a different part of the container 436.

During a collection stage 446, the steam 444 can condense on internal sidewalls of the container 436 and/or the lid 438, thereby forming a collected volume 448 of water within an internal volume of the container 436. In the illustrated example of FIG. 4C, the AWH composite 432 is shown disposed in the same internal volume of the container 436 in which the water 448 is collected. However, other configurations that keep the AWH composite 432 separate from the collected water 448 are also possible according to one or more contemplated embodiments, for example, using a pillar to support the AWH composite 432 above the collected water 448 and/or providing the AWH composite 432 in separate compartment of the container from the volume in which the water collects.

Figure 4D:
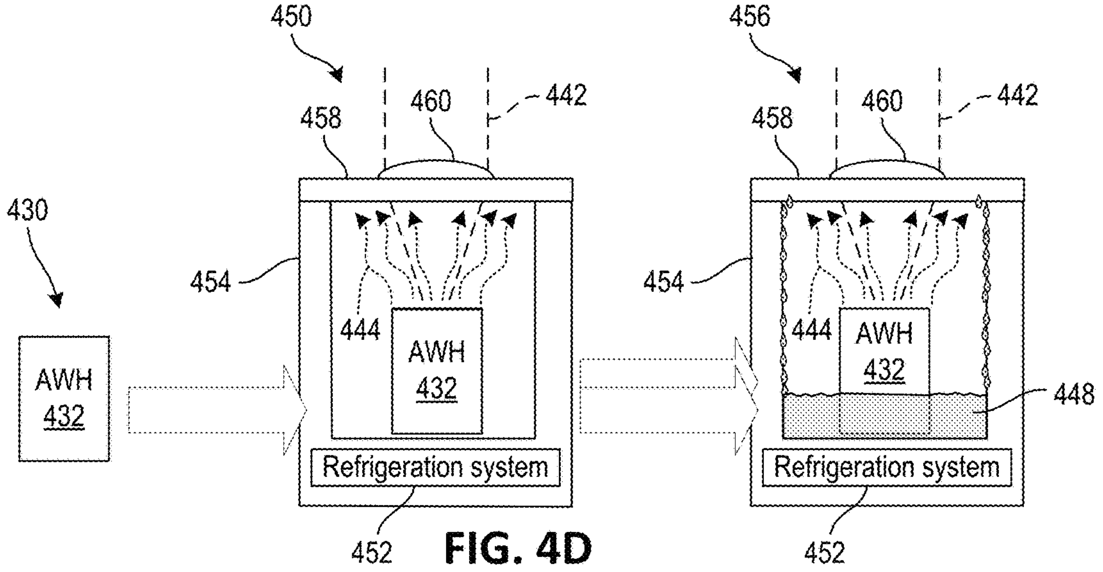
FIG. 4D is a simplified schematic diagram of an AWH system using a refrigeration system for water release, according to one or more embodiments of the disclosed subject matter.

In the illustrated example, of FIG. 4C, the steam 444 condenses on the container and/or lid surfaces, which may be at a temperature closer to ambient since they are not heated by the solar irradiation. However, in some embodiments, an active cooling system can be used to assist or enhance the condensation of the steam generated from the AWH composite. For example, FIG. 4D illustrates operation of another AWH that uses an active cooling mechanism for enhancing the conversion of released steam into liquid water. Similar to the operation of the AWH system in FIG. 4C, the AWH composite 432 can be exposed to atmosphere during a capture stage 430 and heated using solar irradiation 442 concentrated by optical element 460 onto a top surface of the AWH composite 432 during release stage 450. However, a refrigeration system 452 can be used to cool the container 454, or at least internal surfaces thereof, to help condense the steam 444 into collected water 448 during collection stage 456. In some embodiments, the refrigeration system 452 can include an electrically-powered refrigeration device (e.g., vapor compression system, absorption system, thermoelectric cooler, heat pump, etc.) or a heat exchanger.

In the illustrated example, the refrigeration system 452 is part of the container 454. However, in some embodiments, the refrigeration system 452 can be removable from the container 454 or can be a separate component in thermal communication with the container 454. Alternatively or additionally, the refrigeration system 452 can be part of, or at least in thermal communication with, lid 458 or a sidewall of container 454. In some embodiments, a controller can be operatively connected to and control operation of refrigeration system 452, for example, to activate refrigeration system 452 at appropriate times for water release (e.g., in response to a user request, after a predetermined time of exposure to atmosphere for capture, etc.). In some embodiments, the refrigeration system 452 can be connected to an external power source (e.g., electrical grid, photovoltaic panel, etc.). Alternatively or additionally, in some embodiments, the refrigeration system 452 can have an internal power supply (e.g., primary or secondary battery, fuel cell, etc.). In some embodiments, the container 454 and refrigeration system 452, or at least AWH composite 432, can be configured as a portable element (e.g., capable of being held and transported by a single human).

Although the features of FIGS. 4A-4D have been illustrated and discussed separately, features from any one of FIGS. 4A-4D can be included in and/or applied to any other of FIGS. 4A-4D. For example, in some embodiments, refrigeration system 452 from FIG. 4D could be applied to the collector 408 and/or storage 410 in FIGS. 4A-4B for condensing steam 406 into liquid water. Alternatively or additionally, in some embodiments, positioning mechanism 424 from FIG. 4B could be applied to the setup of FIGS. 4C-4D to allow continuous or semi-continuous operation with multiple AWH composites 432. Other variations and/or feature combinations are also possible according to one or more contemplated embodiments.

Computer Implementation Examples

Figure 5:
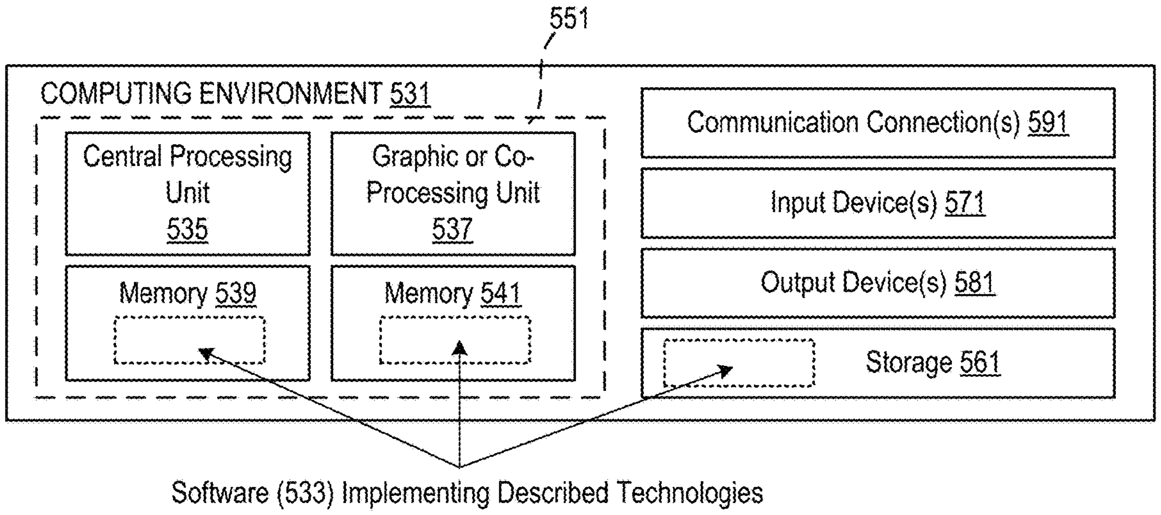
FIG. 5 depicts a generalized example of a computing environment in which the disclosed technologies may be implemented.

FIG. 5 depicts a generalized example of a suitable computing environment 531 in which the described innovations may be implemented, such as but not limited to aspects of controller 112, method 200, and/or method 300. The computing environment 531 is not intended to suggest any limitation as to scope of use or functionality, as the innovations may be implemented in diverse general-purpose or special-purpose computing systems. For example, the computing environment 531 can be any of a variety of computing devices (e.g., desktop computer, laptop computer, server computer, tablet computer, etc.).

With reference to FIG. 5, the computing environment 531 includes one or more processing units 535, 537 and memory 539, 541. In FIG. 5, this basic configuration 551 is included within a dashed line. The processing units 535, 537 execute computer-executable instructions. A processing unit can be a central processing unit (CPU), processor in an application-specific integrated circuit (ASIC), or any other type of processor (e.g., hardware processors, graphics processing units (GPUs), virtual processors, etc.). In a multi-processing system, multiple processing units execute computer-executable instructions to increase processing power. For example, FIG. 5 shows a central processing unit 535 as well as a graphics processing unit or co-processing unit 537. The tangible memory 539, 541 may be volatile memory (e.g., registers, cache, RAM), non-volatile memory (e.g., ROM, EEPROM, flash memory, etc.), or some combination of the two, accessible by the processing unit(s). The memory 539, 541 stores software 533 implementing one or more innovations described herein, in the form of computer-executable instructions suitable for execution by the processing unit(s).

A computing system may have additional features. For example, the computing environment 531 includes storage 561, one or more input devices 571, one or more output devices 581, and one or more communication connections 591. An interconnection mechanism (not shown) such as a bus, controller, or network interconnects the components of the computing environment 531. Typically, operating system software (not shown) provides an operating environment for other software executing in the computing environment 531, and coordinates activities of the components of the computing environment 531.

The tangible storage 561 may be removable or non-removable, and includes magnetic disks, magnetic tapes or cassettes, CD-ROMs, DVDs, or any other medium which can be used to store information in a non-transitory way, and which can be accessed within the computing environment 531. The storage 561 can store instructions for the software 533 implementing one or more innovations described herein.

The input device(s) 571 may be a touch input device such as a keyboard, mouse, pen, or trackball, a voice input device, a scanning device, or another device that provides input to the computing environment 531. The output device(s) 581 may be a display, printer, speaker, CD-writer, or another device that provides output from computing environment 531.

The communication connection(s) 591 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or any other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java™, Python®, and/or any other suitable computer language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above-described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

AWH Water Bottles

Figure 6A:
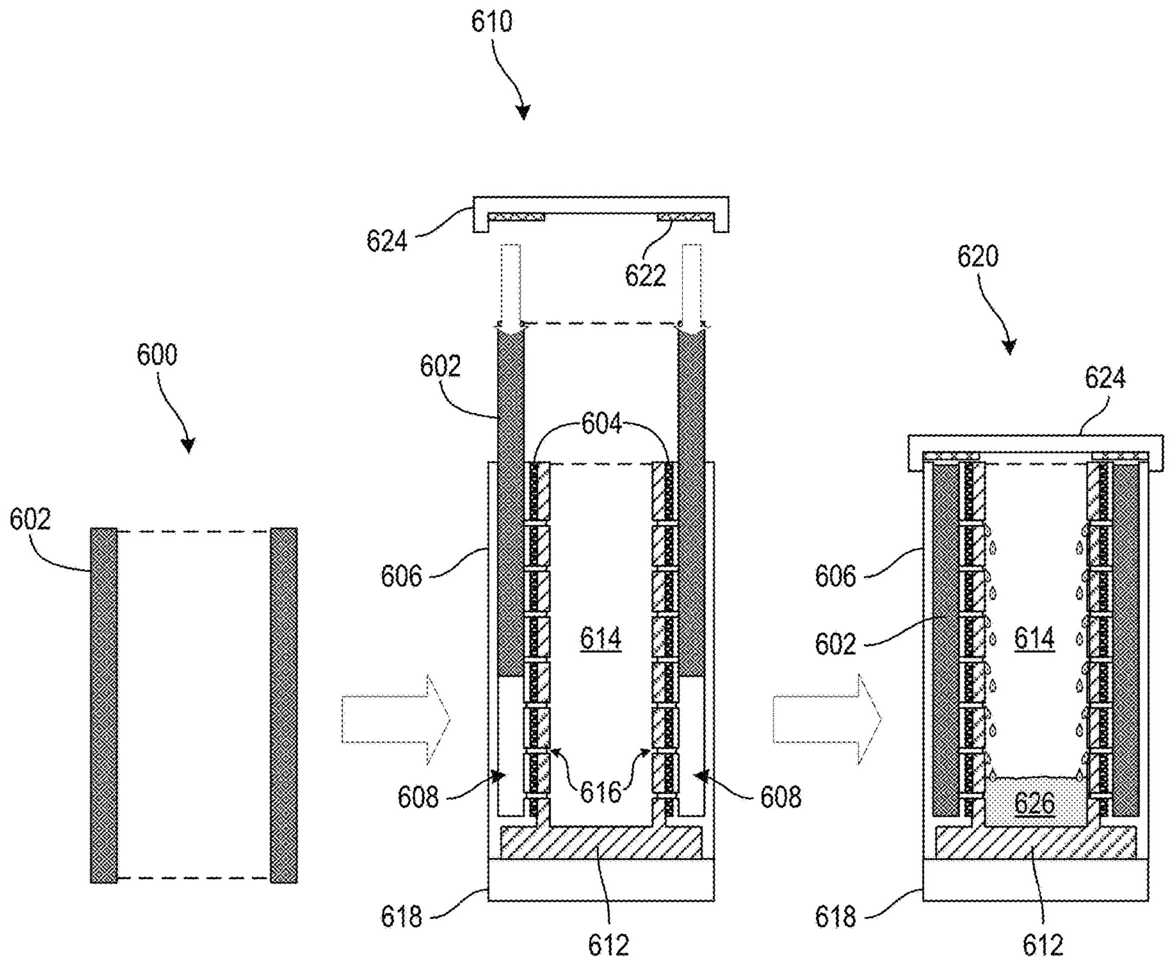
FIG. 6A shows cross-sectional views illustrating the operation of a water bottle employing an AWH composite, according to one or more embodiments of the disclosed subject matter.

In some embodiments, AWH composites can be used as part of a water bottle system, for example, to offer a portable water supply in situations or environments when access to drinkable water is needed or desired but not readily accessible, such as when hiking or camping. For example, FIG. 6A illustrates the operation of a water bottle employing one or more AWH composite inserts. The water bottle can have an AWH composite insert 602, an insulating layer 604, a main body or housing 606 with slot 608, an inner layer 612 defining and/or bounding an interior water storage volume 614, and a cap 624 with spacer 622. The slot 608 can be sized and shaped to accept insertion of the AWH composite insert 602, and the AWH composite insert 602 can be removed from the housing 606 via the slot 608, for example, for exposure to the atmosphere. The slot 608, and AWH composite insert 602 when disposed therein, can be in fluid communication with the water storage volume 614 via one or more holes 616 extending through the insulating layer 604 and/or the inner layer 612. In the illustrated example, the AWH composite insert 602 has a cylindrical shape, and the slot 608 has a complementary annular shape. However, other shapes and configurations for the AWH composite insert and/or the slot are also possible according to one or more contemplated embodiments.

The housing 606 can be formed of any solid material, such as but not limited to plastic or glass. In some embodiments, at least a portion of the housing 606 can be formed of a transparent material, such that solar radiation can pass through the housing 606 to be incident on and heat the AWH composite 602. The inner layer 612 can be formed of any solid material, such as but not limited to a metal (e.g., stainless steel). In some embodiments, the insulating layer 604 can be a physical layer disposed between the slot 608 and the inner layer 612 along a radial direction of the housing 606. For example, the insulating layer 604 can be formed of an insulating foam. Alternatively, in some embodiments, the insulating layer 604 could be an open area, for example, a vacuum sealed space or filled with air. The spacer 622 can be formed of a soft or compressible material, such as but not limited to soft plastic, silicone, or rubber. In some embodiments, the spacer 622 can be configured or operate as a gasket. The cap 624 can be formed of any solid material, such as but not limited to plastic or metal. In some embodiments, the cap 624 can be threaded, for example, to screw onto corresponding threads on housing 606 or inner layer 612.

During a capture stage 600, an AWH composite insert 602 can be exposed to the atmosphere, for example, by removing the AWH composite insert 602 from the housing 606. Once the AWH composite insert 602 has been saturated with water, or any other time that water may be needed or desired, the lid 624 can be removed from the housing 606, and the AWH composite insert 602 can be placed into slot 608, as shown in assembly stage 610. Once the AWH composite insert 602 is fully inserted, the lid 624 can be replaced. In the release stage 620, the AWH composite insert 602 can be heated to release the captured water therein as water vapor. For example, in some embodiments, the heating can be provided by solar irradiation of the AWH composite insert 602 (e.g., through the transparent housing 606), by solar irradiation of the housing 606 (e.g., when the housing is opaque to solar wavelengths), by a heating element disposed within the housing 606 (e.g., an electrical heating element integrated into a sidewall of the housing 606), by externally heating the housing 606 (e.g., by disposing the water bottle near a fire), or by any other means for heating.

The water vapor generated by heating the AWH composite insert 602 can flow from slot 608 to the storage volume 614 via the drainage holes 616. In some embodiments, interaction with the inner layer 612 en route to or within the storage volume 614 can cool and condense the water vapor, thereby accumulating a volume of liquid water 626 within storage volume 614. A user can remove the lid 624 to access (e.g., drink or dispense) the accumulated water within storage volume 614. In some embodiments, multiple AWH composite inserts can be provided, although only one may be accommodated within the housing 606 at a time. For example, one AWH composite insert can be provided within the water bottle for release of water therefrom, while one or more AWH composite inserts are disposed outside the water bottle and continue to capture water.

In some embodiments, the water bottle can optionally be provided with a cooling module. In FIG. 6A, a cooling module 618 is provided in thermal communication with the inner layer 612, for example, to cool the inner layer 612 to provide or enhance condensation of the released water vapor within the water bottle. For example, the cooling module 618 can include a refrigeration device (e.g., thermoelectric cooler) and/or a power source (e.g., battery). In some embodiments, the cooling module 618 can be integrated with the housing 606 and/or inner layer 612. Alternatively or additionally, the cooling module 618, or at least a portion thereof (e.g., battery), may be removable or detachable from the housing 606 and/or inner layer 612.

Figure 6B:
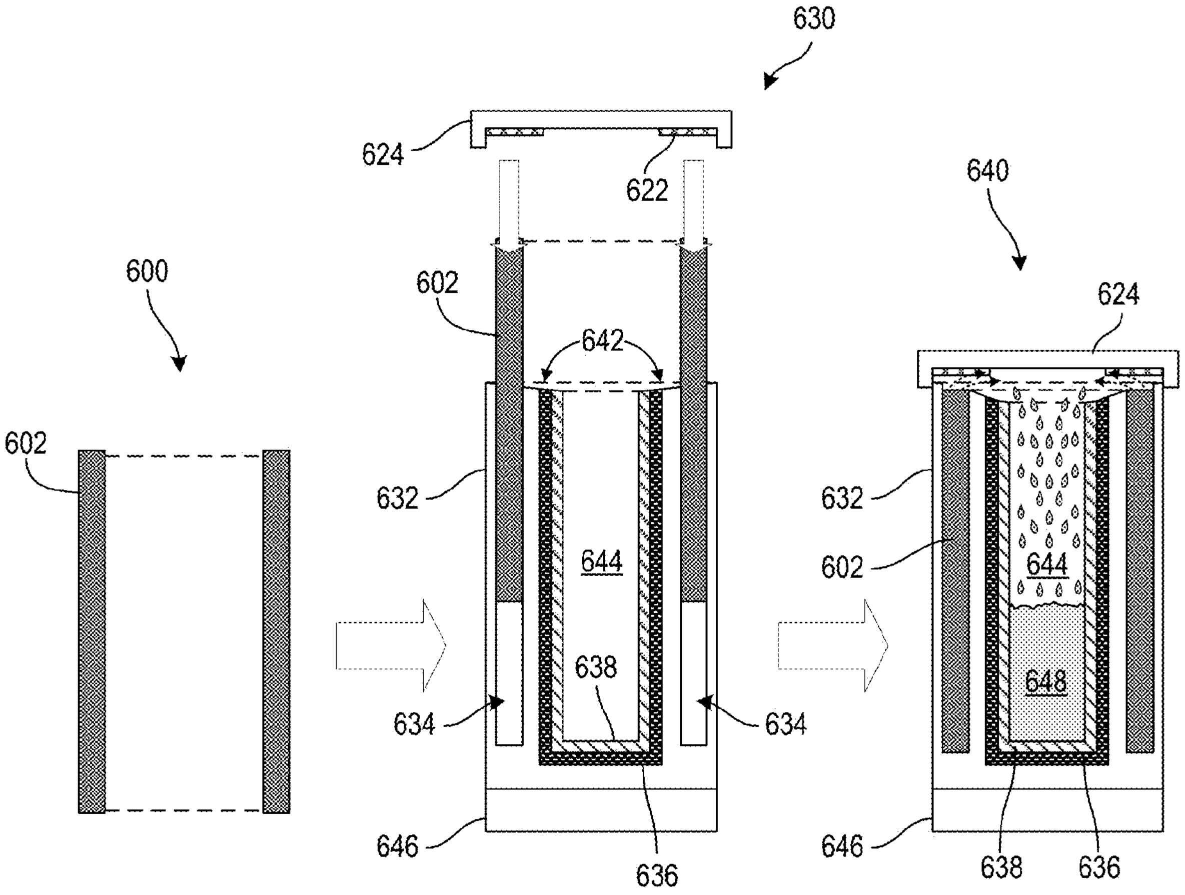
FIG. 6B shows cross-sectional views illustrating the operation of another water bottle employing an AWH composite, according to one or more embodiments of the disclosed subject matter.

FIG. 6B illustrates the operation of another water bottle employing one or more AWH composite inserts. Similar to the water bottle of FIG. 6A, the water bottle of FIG. 6B can have an AWH composite insert 602, a main body or housing 632 with slot 634, an insulating layer 636, an inner layer 638 defining and/or bounding an interior water storage volume 644, and a cap 624 with spacer 622. The slot 634 can be sized and shaped to accept insertion of the AWH composite insert 602, and the AWH composite insert 602 can be removed from the housing 632 via the slot 634, for example, for exposure to the atmosphere. The slot 634, and AWH composite insert 602 when disposed therein, can be in fluid communication with the water storage volume 644 via an open area or gap 642 at the top of the insulating layer 636 and/or the inner layer 638. In the illustrated example, the AWH composite insert 602 has a cylindrical shape, and the slot 634 has a complementary annular shape. However, other shapes and configurations for the AWH composite insert and/or the slot are also possible according to one or more contemplated embodiments.

The housing 632 can be formed of any solid material. In some embodiments, at least a portion of the housing 632 can be formed of a material that readily conducts heat (e.g., thermally conductive material), for example, a metal. The inner layer 638 can be formed of any solid material, such as but not limited to a metal (e.g., stainless steel). In some embodiments, the insulating layer 636 can be a physical layer disposed between the housing 632 and the inner layer 638 along radial and axial directions of the housing 632. For example, the insulating layer 636 can be formed of an insulating foam. Alternatively, in some embodiments, the insulating layer 636 could be an open area, for example, a vacuum sealed space or filled with air. The spacer 622 can be formed of a soft or compressible material, such as but not limited to soft plastic, silicone, or rubber. In some embodiments, the spacer 622 can be configured or operate as a gasket. The cap 624 can be formed of any solid material, such as but not limited to plastic or metal. In some embodiments, the cap 624 can be threaded, for example, to screw onto corresponding threads on housing 632 or inner layer 638.

During a capture stage 600, an AWH composite insert 602 can be exposed to the atmosphere, for example, by removing the AWH composite insert 602 from the housing 632. Once the AWH composite insert 602 has been saturated with water, or any other time that water may be needed or desired, the lid 624 can be removed from the housing 632, and the AWH composite insert 602 can be placed into slot 634, as shown in assembly stage 630. Once the AWH composite insert 602 is fully inserted, the lid 624 can be replaced. In the release stage 640, the AWH composite insert 602 can be heated to release the captured water therein as water vapor. The water vapor generated by heating the AWH composite insert 602 can flow from slot 634 to the storage volume 644 via the gap 642. In some embodiments, interactions with the inner layer 644 and/or lid 624 en route to or within the storage volume 644 can cool and condense the water vapor, thereby accumulating a volume of liquid water 648 within storage volume 644. A user can remove the lid 624 to access (e.g., drink or dispense) the accumulated water within storage volume 644. In some embodiments, multiple AWH composite inserts can be provided, although only one may be accommodated within the housing 632 at a time. For example, one AWH composite insert can be provided within the water bottle for release of water therefrom, while one or more AWH composite inserts are disposed outside the water bottle and continue to capture water.

In some embodiments, the heating can be provided by a heating module. In FIG. 6B, a heating module 646 is provided in thermal communication with the housing 632 and/or the AWH composite insert 602, for example, to heat the AWH composite insert 602 to release water vapor therefrom. For example, the heating module 646 can include a heating device (e.g., thermoelectric device, Joule heating element, induction heating element, etc.) and/or a power source (e.g., battery). In some embodiments, the heating module 646 can be integrated with the housing 632. Alternatively or additionally, the heating module 646, or at least a portion thereof (e.g., battery), may be removable or detachable from the housing 632.

Although the features of FIGS. 6A-6B have been illustrated and discussed separately, features from either of FIGS. 6A-6B can be included in and/or applied to the other of FIGS. 6A-6B. For example, in some embodiments, cooling module 618 from FIG. 6A could be used in addition to or in place of the heating module 646 in FIG. 6B, and/or the heating module 646 from FIG. 6B could be used in addition to or in place of the cooling module 618 in FIG. 6A. Alternatively or additionally, in some embodiments, the drainage holes 616 from FIG. 6A could be used in addition to or in place of gap 642 in FIG. 6B, and/or the gap 642 from FIG. 6B could be used in addition to or in place of drainage holes 616 in FIG. 6A. In some embodiments, other configurations for conveying water vapor and/or condensation from the AWH composite insert to the respective collection volume can be used in addition to or in place of drainage holes 616 and/or gap 642. Other variations and/or feature combinations are also possible according to one or more contemplated embodiments.

Fabricated Examples and Experimental Results

Nanofibrillated cellulose (NFC) was prepared by a 2,2,6,6-tetramethylpiperidine (TEMPO) oxidation method from Kraft bleached dried softwood pulp. In particular, a buffer solution was prepared by mixing 8.48 g sodium carbonate and 1.64 g sodium bicarbonate in 1 L deionized (DI) water. A total of 30 g dry Kraft bleached softwood pulp was dispersed in 500 mL DI water under mechanical stirring overnight, followed by adding 100 mL TEMPO (solid weight 468.75 mg) aqueous solution and 300 mL sodium bromide (solid weight 3.09 g) aqueous solution. The oxidation reaction was initiated with dropwise addition of 65 mL sodium hypochlorite under mechanical stirring. The pH of the solution was maintained in a range of 10-10.5 during the reaction by dropwise adding 1 mol/L sodium hydroxide solution. The reaction was maintained for 2 hours. The resulting oxidized cellulose fiber dispersion was washed three times with DI water to remove the residual chemicals, then filtered to obtain oxidized cellulose fibers. The aqueous solution of oxidized cellulose fibers was treated in a high-pressure homogenizer to reduce the fiber diameter and length, resulting in a 1 wt % TEMPO-oxidized NFC dispersion, which was stored at 4° C. until use.

To form the composite foam, NFC and graphite powder were combined. In particular, the 0.5 wt % NFC and graphite powder were mixed in a solid mass ratio of 1:20 by a mechanical mixer to obtain a graphite/NFC dispersion. The resulting dispersion was subjected to an ultrasonic treatment using an ultrasonic homogenizer for 90 minutes to yield a graphite/NFC slurry. A further graphite/NFC dispersion with desired graphite-to-NFC mass ratio was made by mixing the graphite/NFC slurry with 1 wt % NFC dispersion. The further graphite/NFC dispersion was transferred into a cubic container followed by freezing using liquid nitrogen.

The frozen samples were then lyophilized using a commercial freeze-drier to produce a graphite/NFC (GNFC) foam. A carbonized GNFC (CGNFC) foam was then produced by annealing the GNFC foam at 500° C. under inert atmosphere (e.g., argon) in a tube furnace for two hours. The resulting CGNFC foams were immersed in LiCl solution (at different concentrations) and subjected to vacuum in a vacuum chamber to fill the pores and channels in the foam with LiCl solution. The soaked foams were then oven dried at 105° C. to yield LiCl@CGNFC composites.

Figure 7A:
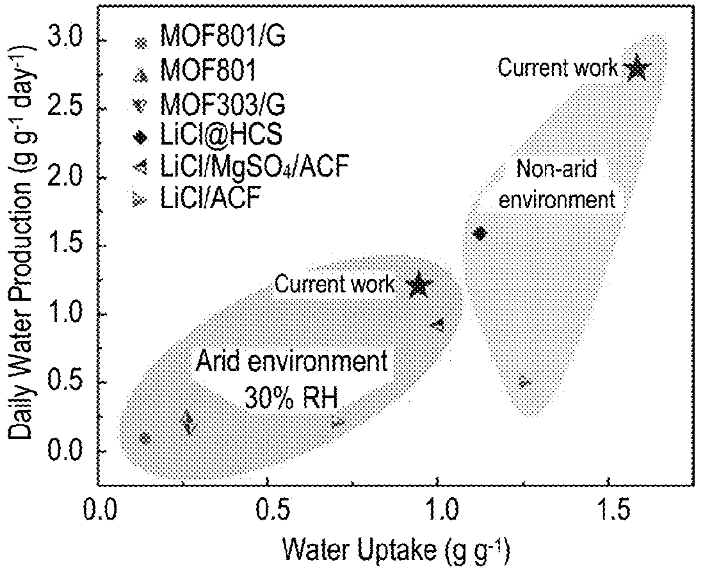
FIG. 7A is a graph comparing daily water production and water uptake capacity of various absorbents, including examples of the disclosed AWH composite.

FIG. 7A compares AWH performance of various absorbents, including metal-organic framework 801 blended with 33 wt % nonporous graphite (MOF801/G), metal-organic framework 801 (MOF801), metal-organic framework 303 blended with 33 wt % nonporous graphite (MOF303/G), hollow carbon spheres with LiCl (LiCl@HCS), activated carbon fiber combined with LiCl and $MgSO_4$ (LiCl/$MgSO_4$/ACF), activated carbon fiber combined with LiCl (LiCl/ACF), CGNFC loaded with LiCl (LiCl@CGNFC). Water uptake capacity is defined as the weight of absorbed water (in grams) per gram of the absorbent material after equilibrium at a certain relative humidity (RH) and temperature, which illustrates the maximum water uptake capacity in an ideal environment. Additionally, daily water production describes the weight of absorbed water (in grams) per gram of the absorbent material in one day after several harvesting cycles, which demonstrates the practical water harvesting capacity in a certain environment.

Figure 7B:
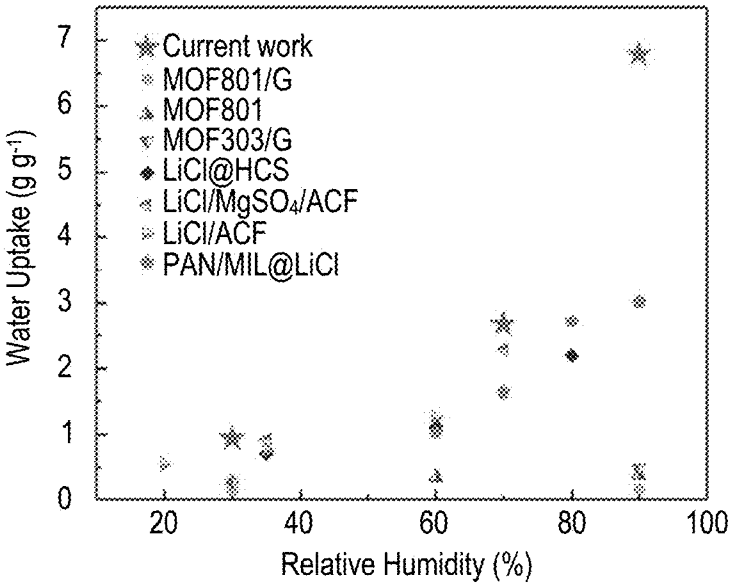
FIG. 7B is a graph comparing atmospheric water uptake of various absorbents, including examples of the disclosed AWH composite, at different relative humidities.

In both arid environments (i.e., RH≤30%) and non-arid environments (i.e., 30%<RH≤60%), the LiCl@CGNFC foam exhibits better water uptake capacity and daily water production as compared to the other absorbents, thus demonstrating the potential of the disclosed composites to harvest atmospheric water in a wide range of environments. The water uptake capacity of the LiCl@CGNFC foam was measured to be 0.93 g/g (30% RH) and 1.57 g/g (50% RH) at saturation. In arid environments, the LiCl@CGNFC foam exhibited higher water uptake capacity at saturation (0.93 g/g at 30% RH) than either MOF801 (0.26 g/g at 30% RH) and LiCl@HCS (0.70 g/g at 35% RH). As shown in FIG. 7B, the water uptake capacity of the LiCl@CGNFC foam in non-arid (wet) environments (90% RH, 25° C.) is at least more than two times higher (e.g., 6.78 g/g) than the other absorbents.

Figure 7C:
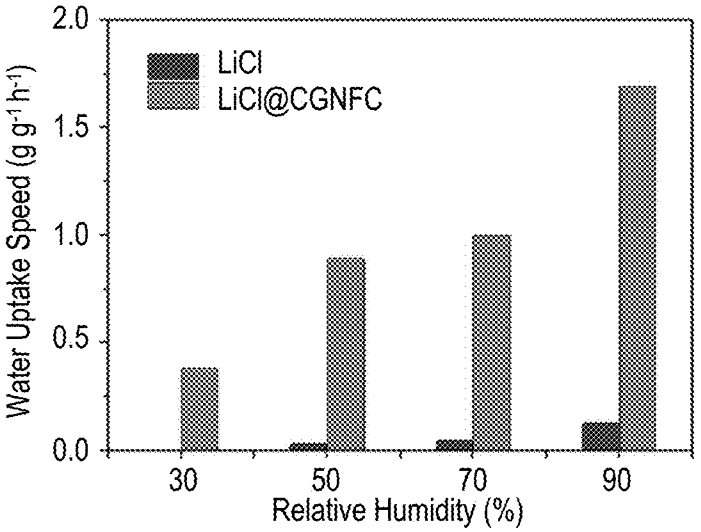
FIG. 7C is a graph comparing the water uptake speed of pure LiCl particles and an example of the disclosed AWH composite (4% LiCl solution) at 25° C. and different relative humidities during the first hour of operation.

In addition to water uptake capacity, water uptake and release speeds further define the AWH performance of materials. Water uptake speed and water release speed are defined as the weight of absorbed water and released water per gram of the absorbent material per hour (g/g per hour), respectively. As shown in FIG. 7C, when the RH is about 30%, the water uptake speed of the LiCl@CGNFC foam at saturation (0.21 g/g per hour) was higher than that of MOF801 at saturation (0.04 g/g per hour) and LiCl@HCS at saturation (0.18 g/g per hour). The water release speed of the LiCl@CGNFC foam was 6.44 g/g per hour, which was much higher than that of either MOF801 (0.11 g/g per hour) or LiCl@HCS (2.51 g/g per hour). The exceptional water uptake and release speeds of LiCl@CGNFC lead to remarkable daily water production of a LiCl@CGNFC-based AWH device (1.24 g/g per day in an arid environment, 30% RH, and 2.83 g/g per day in a non-arid environment, 30%-60% RH). Table 1 compares the water uptake capacity, water uptake speed, water release speed, and daily water production of the LiCl@CGNFC foam with those of representative absorbents (i.e., MOF 801 and LiCl@HCS), demonstrating the promising potential of the LiCl@CGNFC foam as a high-performance AWH material.

TABLE 1

Comparison of water harvesting performance for different functional materials (water uptake and release speeds calculated at saturation).

| | Metal-Organic Framework 801 (MOF 801) | LiCl in hollow capsule sorbent (LiCl@HCS) | LiCl in carbonized graphite nanofibrillated cellulose foam (LiCl@CGNFC) |
|---|---|---|---|
| Water uptake capacity at 30% RH (g/g) | 0.26 | 0.7 | 0.93 |
| Water uptake speed (g/g per hour) | 0.04 | 0.18 | 0.21 |
| Water release speed (g/g per hour) | 0.11 | 2.51 | 6.44 |

TABLE 1-continued

Comparison of water harvesting performance for different functional materials (water uptake and release speeds calculated at saturation).

| | Metal-Organic Framework 801 (MOF 801) | LiCl in hollow capsule sorbent (LiCl@HCS) | LiCl in carbonized graphite nanofibrillated cellulose foam (LiCl@CGNFC) |
|---|---|---|---|
| Daily water production (g/g per day) | 0.25 (Dessert) | 1.6 (Non-arid environ.) | 1.24 (Arid environ.) 2.83 (Non-arid environ.) |

Figure 8A:
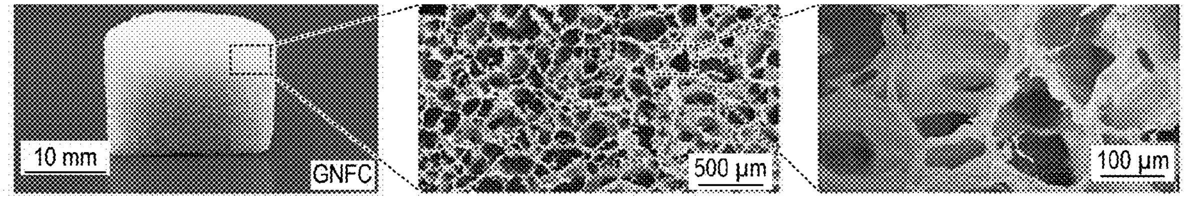
FIG. 8A shows a photograph and scanning electron microscopy (SEM) images of a fabricated graphite-NFC (GNFC) foam.
Figure 8B:
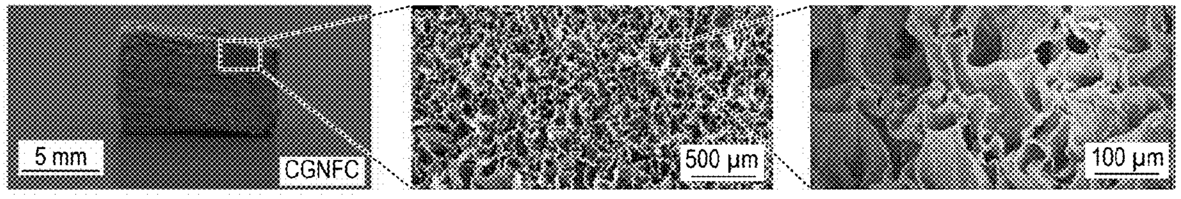
FIG. 8B shows a photograph and SEM images of a fabricated carbonized GNFC (CGNFC) foam.
Figure 8C:
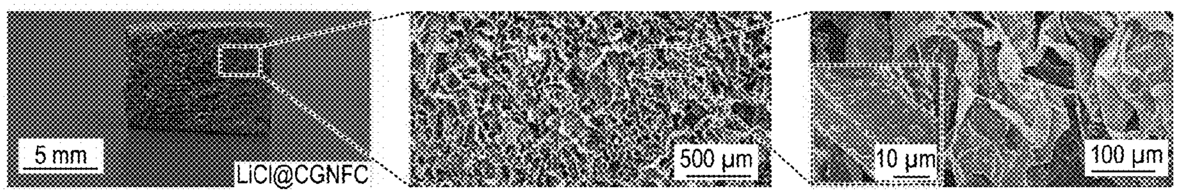
FIG. 8C shows a photograph and SEM images of a fabricated CGNFC foam loaded with LiCl (LiCl@CGNFC).

FIG. 8A shows a GNFC foam, as fabricated. The GNFC foam has a pore diameter of 100-150 μm and a density of 0.006 g/cm$^3$. As shown in FIG. 8B, after carbonization, the color of the foam changes from light grey to dark, and the volume shrinks to about ⅛ of the pristine volume, which leads to a denser foam with a pore size ranging from 25 μm to 100 μm and a density of 0.029 g/cm$^3$. The change of foam structure and density results from the loss of a large amount of hydrogen and oxygen during the carbonization in an argon atmosphere. FIG. 8C shows the appearance and microscale porous structure of the LiCl@CGNFC foam, whose volume and pore size are consistent with those of CGNFC foam prior to LiCl coating. The inset in the rightmost image of FIG. 8C shows that the LiCl crystalline particles evenly scatter coat on the internal surfaces of the LiCl@CGNFC foam, resulting in an increase of the foam density to 0.092 g/cm$^3$.

Figure 8D:
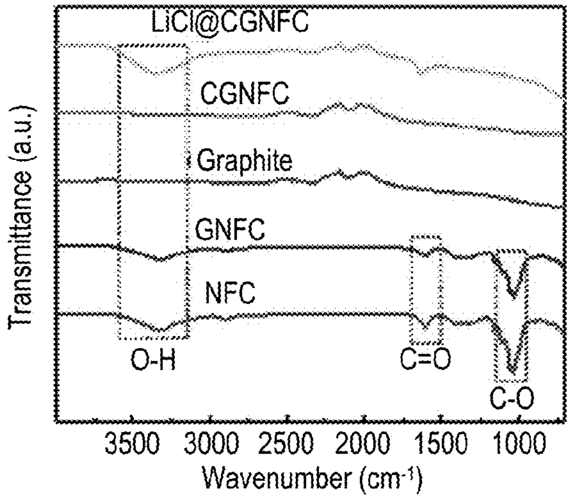
FIG. 8D shows the results of Fourier transform infrared (FTIR) spectroscopy for fabricated NFC, graphite, GNFC, CGNFC, and LiCl@CGNFC foams.

To investigate chemical compositions during different stages of the fabrication process, Fourier-transform infrared (FTIR) spectroscopy was performed on NFC, graphite, GNFC foam, CGNFC foam, and LiCl@CGNFC foam, the results of which are shown in FIG. 8D. The peaks at 1034 cm$^{-1}$ can be attributed to the stretching vibration of the C—O due to the oxygen-rich cellulose molecules in NFC and GNFC samples. The peaks at 1407 cm$^{-1}$ and 1315 cm$^{-1}$ can be ascribed to $CH_2$ wagging symmetric bending and asymmetric bending vibrations, due to the $CH_2$ groups on the backbone of cellulose. The peaks at 1600 cm$^{-1}$, which appear on the curves of NFC, GNFC, and LiCl@CGNFC, are due to ester C═O stretching vibrations (from the carboxyl groups on NFC) or bending mode of absorbed water. The band ranging from 3200 cm$^{-1}$ to 3500 cm$^{-1}$ is due to the characteristic absorption of the O—H stretching vibrations on cellulose molecules and absorbed water. This band cannot be found on the curves of graphite and CGNFC foam due to the absence of oxygen in graphite and the removal of oxygen during the carbonization process, respectively.

Figure 8E:
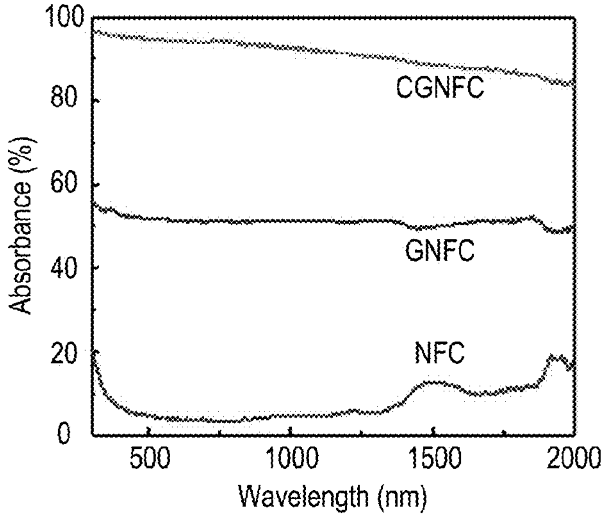
FIG. 8E shows the results of ultraviolet-visible (UV-Vis) spectroscopy for fabricated NFC, GFC, and CGNFC foams.

As shown in FIG. 8E, the LiCl@CGNFC foam exhibited excellent light absorbance in a wide spectral range, from ultraviolet (UV) to near-infrared (NIR) (λ=300 nm to 2 μm). The CGNFC foam can absorb more than 90% of light in the wavelength range of 300-1200 nm, due to the light absorbance capability of amorphous carbon converted from the cellulose skeleton during the carbonization. In contrast, without carbonization, the NFC foam (≤20%) and GNFC foam (≤58%) exhibit much lower absorbance within the same wavelength range. The wide spectral light absorbance of the CGNFC foam leads to highly efficient heating via solar radiation, which can allow the solar radiation to be used for evaporating water from the foam.

Figure 8F:
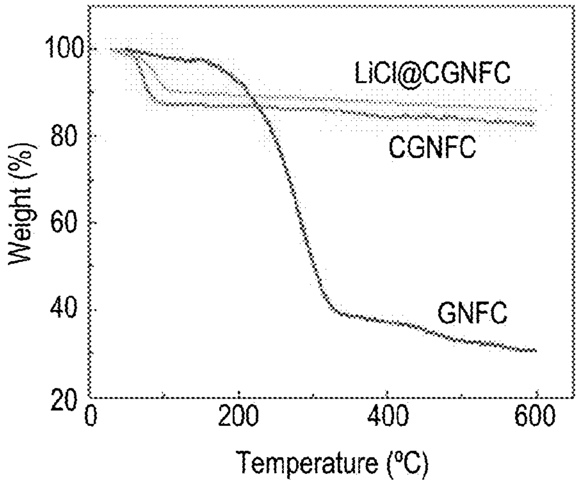
FIG. 8F shows the results of thermogravimetric analysis (TGA) for fabricated GNFC, CGNFC, and LiCl@CGNFC foams.

The thermal stability of various foams in an argon atmosphere was investigated by exposing to temperatures from 30° C. to 600° C. FIG. 8F shows the relative weight (as compared to the starting weight) of the GNFC, CGNFC, and LiCl@CGNFC foams as a function of temperature. For temperatures in a range of 180-320° C., the GNFC foam sample experienced significant weight loss (60%), which can be ascribed to the thermal degradation of cellulose. In particular, dehydration and decomposition of cellulose in this temperature range can lead to the release of $H_2O$ and $CO_2$ from the sample. In contrast, CGNFC and LiCl@CGNFC experienced minimal loss, with small weight losses for temperatures in a range of 30-100° C., followed by a plateau in a range of 100-600° C. The small weight loss in the 30-100° C. range can be attributed to the evaporation of water from the samples, while the long plateau can be attributed to the stabilization offered by previously performed carbonization. The LiCl@CGNFC foam remains thermally stable up to at least 600° C., demonstrating its potential as a solar-to-thermal conversion material.

Figure 9A:
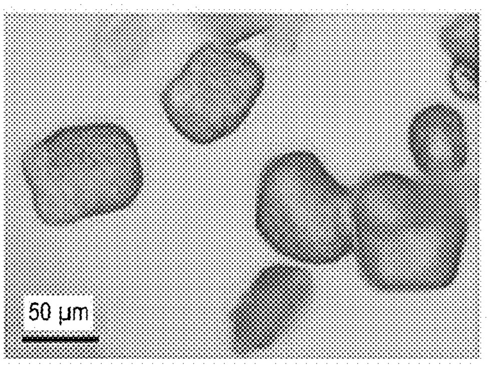
FIG. 9A is a photograph illustrating the size of commercially-available LiCl particles.
Figure 9B:
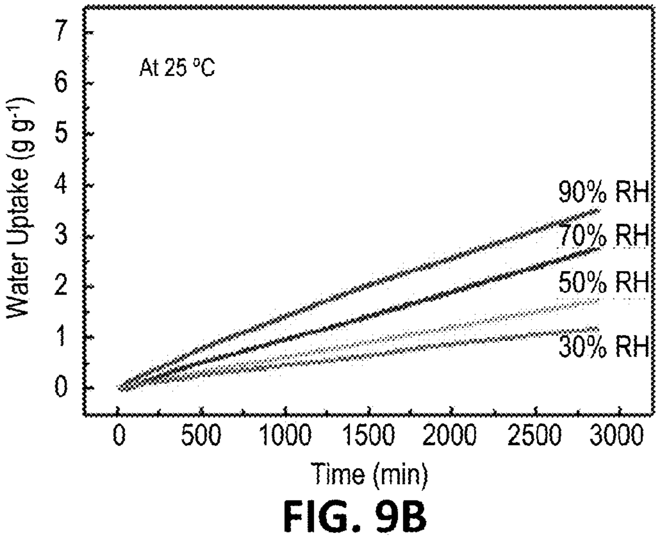
FIG. 9B is a graph comparing atmospheric water uptake at 25° C. of the LiCl particles of FIG. 9A at different relative humidities.

While LiCl is known for its deliquescent behavior in air, conventional applications typically employ large crystals. For example, as shown in FIG. 9A, typical LiCl crystals have a size of about 50 μm, which can limit the AWH performance of the LiCl. For example, as shown in FIG. 9B, the water uptake speed of LiCl crystals can be relatively constant for a given RH, with higher values of RH yielding higher water uptake speeds for the LiCl crystals (e.g., for the first hour of water uptake, 0.001 g/g per hour at 30% RH; 0.027 g/g per hour at 50% RH; 0.047 g/g per hour at 70% RH, and 0.125 g/g per hour at 90% RH). In contrast, the highly porous structure of the CGNFC foam provides large surface areas for LiCl doping. After the CGNFC foam is soaked in LiCl solution and then dried, two types of LiCl particles form on the internal surfaces of the foam—LiCl nanoparticles (with diameters of 100-500 nm) and snowflake-like LiCl structures (e.g., similar to that shown in FIG. 1). The small size of the LiCl nanoparticles (e.g., 100 times smaller than typical LiCl particles) and the dendrite nature of the LiCl flakes in the CGNFC foam lead to a larger specific surface area than that of the typical LiCl particles, which enhance the water uptake capacity and speed for the LiCl@CGNFC foam as compared to typical LiCl particles.

Figure 9C:
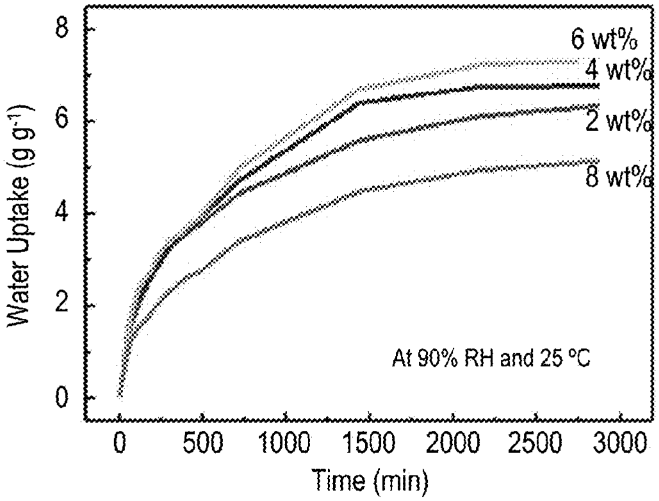
FIG. 9C is a graph comparing atmospheric water uptake over time at 90% relative humidity and 25° C., for LiCl@CGNFC foams fabricated with different LiCl loading.

The water harvesting performance of the LiCl@CGNFC foam can depend on the LiCl loading, RH, and temperature. To investigate the effect of LiCl loading on the water uptake of the LiCl@CGNFC foam, different concentrations of LiCl solutions (2 wt. %, 4 wt. %, 6 wt. %, and 8 wt. %, respectively) were used to soak the CGNFC foams. The water uptake of each of the LiCl@CGNFC foams loaded at different concentrations was then evaluated at 90% RH and 25° C. The initial water uptake speed (1.69 g/g per hour at 90% RH) of the LiCl@CGNFC foam (FIG. 9C), measured by the slope of the curves in the first hour of water uptake, is 13 times higher than the initial water uptake speed (0.13 g/g per hour at 90% RH) of the microscale commercial LiCl particles (FIG. 9B). The water uptake then slows down until the LiCl@CGNFC foam becomes saturated with water, as shown in FIG. 9C. As the LiCl content of the foam increases, the water uptake capability of the foam over the first 48 hours rises, with the foam treated with 6 wt % LiCl solution showing the highest water uptake (7.34 g/g) after 48 hours as compared to foams treated with 2 wt % (6.33 g/g) and 4 wt % (6.78 g/g) LiCl solution. As shown in FIG. 9C, the water uptake capability for the foam treated with 8 wt % LiCl solution (5.13 g/g) is less than the other foams, which could be attributed to the blocked pores and channels in the foam due to overloading with LiCl.

Even though the foam treated with 6 wt % LiCl solution showed the highest water uptake at 90% RH and 25° C., an overflow of LiCl solution was observed in water uptake experiments for LiCl@CGNFC treated with 6 wt % LiCl solution at 90% RH and 35° C. This suggested that the LiCl@CGNFC foam treated with 6 wt % LiCl solution was oversaturated and thus did not hold excess absorbed water, leading to loss of LiCl along with water overflow and subsequent decrease in water uptake speed of the foam in following cycles of atmospheric water uptake. However, the foam treated with 4 wt % LiCl solution did not show any overflow in water uptake experiments at 90% RH and temperatures of either 35° C. or 45° C. Accordingly, the LiCl@CGNFC foam treated with 4 wt % LiCl solution was chosen for subsequent water uptake experiments.

Figure 9D:
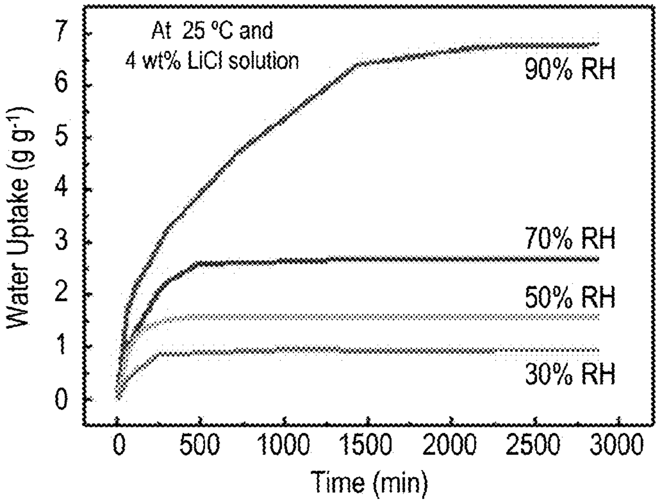
FIG. 9D is a graph comparing atmospheric water uptake over time at different relative humidities and at 25° C., for LiCl@CGNFC foams fabricated with 4 wt % LiCl loading.

FIG. 9D compares water uptake of LiCl@CGNFC foams treated with 4 wt % LiCl solution at 25° C. at different RHs. During the first hour of water uptake, the speeds of LiCl@CGNFC are 0.38 g/g per hour at 30% RH, 0.89 g/g per hour at 50% RH, 1.00 g/g per hour at 70% RH, and 1.69 g/g per hour at 90% RH, which are much higher than the water uptake speeds of LiCl particles at corresponding RH. The improved water uptake speed for LiCl@CGNFC foams can be attributed to the smaller size of the LiCl nanoparticles doped on the internal surface of the foam as compared to the size of commercial LiCl particles. Moreover, the 3-dimensional porous structure of the LiCl@CGNFC foam can provide a larger interface area between the air and LiCl, which interface area may improve water absorption from the atmosphere.

Figure 9E:
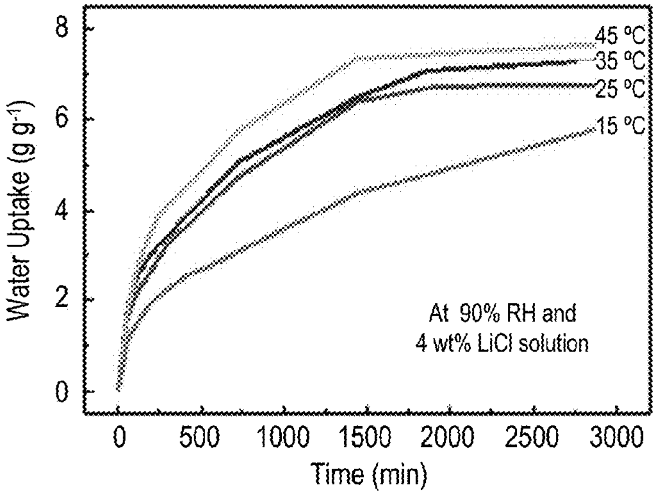
FIG. 9E is a graph comparing atmospheric water uptake over time at 90% relative humidity and at different temperatures, for LiCl@CGNFC foams fabricated with 4 wt % LiCl loading.

As shown in FIG. 9D, the LiCl@CGNFC foam can capture more water at higher RH values than at lower RH values. In particular, the water uptake within the first 48 hours at 90% RH (6.78 g/g) was about seven times larger than the water uptake within the first 48 hours at 30% RH (0.93 g/g). The RH also influences the time until an equilibrium state (e.g., saturation) is reached. As shown in FIG. 9D, the LiCl@CGNFC foam becomes saturated after about 240 μminutes for 30% RH, about 360 minutes for 50% RH, about 480 minutes for 70% RH, and about 2880 minutes (48 hours) for 90% RH. For all RH conditions in FIG. 9D, the highest water uptake speed occurred within the first hour. Water uptake for LiCl@CGNFC foams treated with 4 wt % LiCl solution was measured at 90% RH and at different temperatures between 15° C. and 45° C. As shown in FIG. 9E, higher temperatures allowed for larger water uptake capacity within the first 48 hours, which could be ascribed to the higher absolute water content in the air at higher temperatures.

Figure 10A:
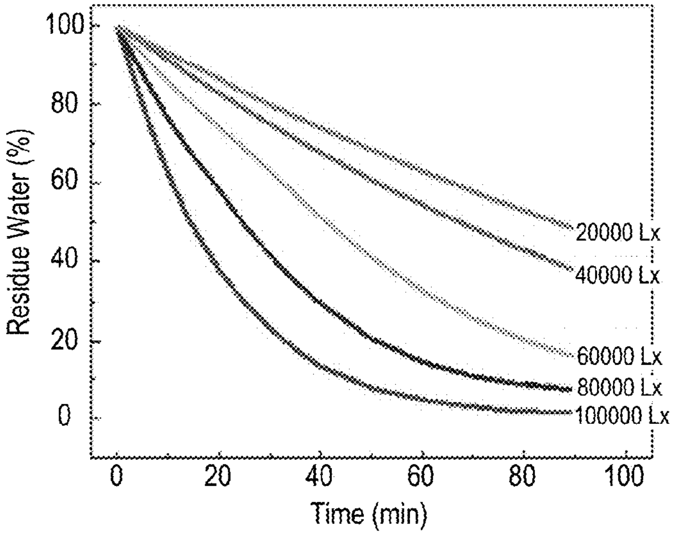
FIG. 10A is a graph comparing water release (residue water %) of LiCl@CGNFC foams fabricated with 4 wt % LiCl loading subjected to different irradiation intensities.

To complete the circle of water harvesting, natural sunlight (without any other energy input) was used to release water from the LiCl@CGNFC foams. As noted above, the LiCl@CGNFC foams can efficiently absorb sunlight and convert it to thermal energy, which heating can be used to evaporate water from the foam for collection. In some cases, the intensity of solar irradiation may be lower than one sun (e.g., 100,000 Lumens/$m^2$ or Lx), for example, on cloudy days or in non-summer seasons. To investigate the influence of irradiation intensity, water release performance of LiCl@CGNFC foams treated with 4 wt % LiCl solution was measured in the ambient environment and under different intensities of irradiation (e.g., 20,000 Lx to 100,000 Lx). As shown in FIG. 10A, the water release speeds of the foam in the first hour of water release were 2.51 g/g per hour for 20,000 Lx, 3.09 g/g per hour for 40,000 Lx, 4.57 g/g per hour for 60,000 Lx, 5.79 g/g per hour for 80,000 Lx, and 6.44 g/g per hour for 100,000 Lx. The foam releases water faster with increasing irradiation intensity. In particular, the LiCl@CGNFC foam treated with 4 wt % LiCl solution was capable of releasing 95% absorbed water with solar irradiation of 100,000 Lx in about an hour. But even at low irradiation intensities, the foam remains capable of releasing water, thereby demonstrating the capability of the foam to harvest water in variety of different conditions.

Figure 10B:
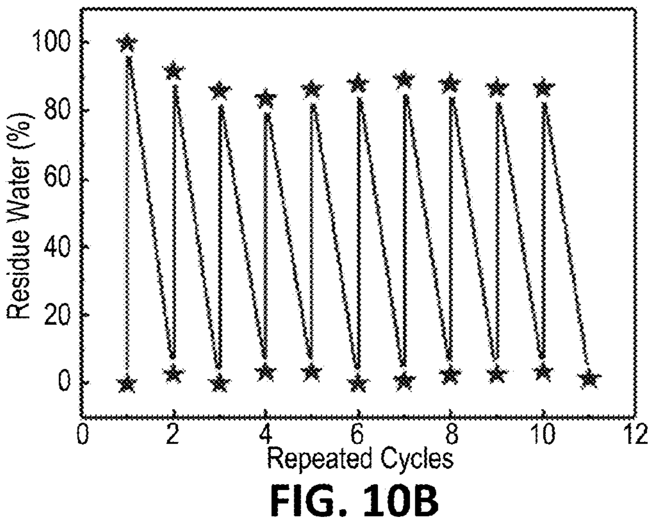
FIG. 10B is a graph comparing water release (residue water %) of LiCl@CGNFC foams fabricated with 4 wt % LiCl loading subjected to multiple cycles of water capture and release.

The water harvesting cyclic stability of LiCl@CGNFC foam was evaluated, with water uptake performed at 90% RH and 25° C. and water release performed in the ambient environment under one sun irradiation. In each water uptake-release cycle, the foam was allowed to absorb atmospheric water for 1 hour, followed by exposure to one sun irradiation for 1 hour to release water. The weight of the absorbed water at the end of the first water uptake process was defined as 100% residue water. As shown in FIG. 10B, the foam exhibited stable water harvesting performance with negligible degradation after 10 cycles of water uptake and release. The water harvesting capability of the LiCl@CGNFC foam was up to 1.23 g/g in one cycle. As shown in FIG. 10B, the maximum absorbed water amount reduces modestly from 100% (the first cycle) to 85.8% (the third cycle) and then stabilizes at around 85% for the remaining 7 cycles. Without being bound by any particular theory, it is believed that the modest reduction of water uptake in the initial cycles can be attributed to the agglomeration of some of the LiCl particles to form larger LiCl particles, which in turn could restrain water uptake speed. After a few cycles, the size of the LiCl particles does not increase further, such that the water harvesting capacity of the LiCl@CGNFC foam stabilizes.

Figure 10C:
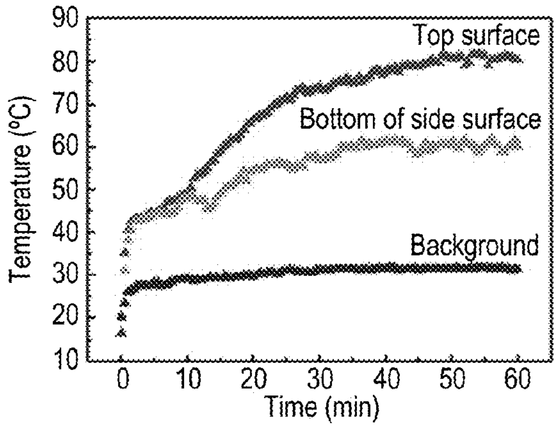
FIG. 10C is a graph comparing temperature at various portions of an LiCl@CGNFC foam over time when subjected to concentrated solar irradiation at its top surface.
Figure 10D:
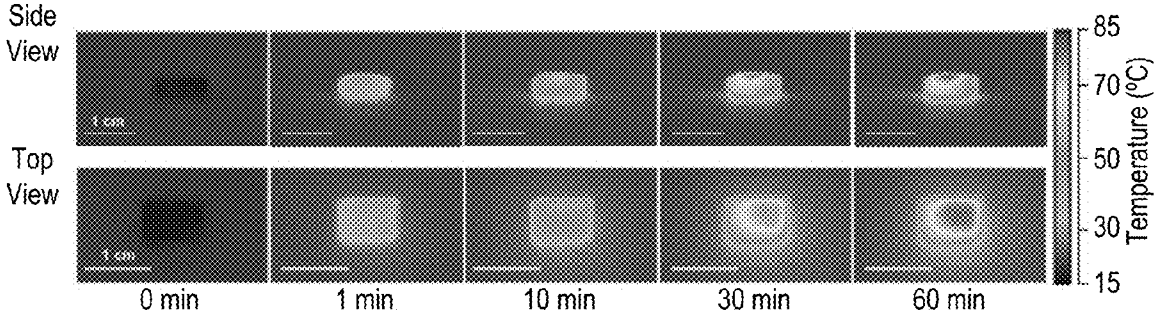
FIG. 10D shows top and side view images of an LiCl@CGNFC foam at different times of concentrated solar irradiation.

Temperature was measured at different parts of the foam (top surface, bottom of a side surface, and background) during the water release process, i.e., when heated by solar irradiation. After only 1 minute of irradiation, the foam exhibited a higher temperature than background, demonstrating its efficient solar-to-thermal conversion capability. As shown in FIG. 10C, the foam exhibited two distinct stages during the heating, for example, an initial rapid heating stage (over the first 2 minutes) and a subsequent slower heating stage (after 2 minutes). Since the irradiation is incident on the top of the foam, the top surface exhibited the highest temperature at any given moment, the heating of which was conducted to the remainder of the foam. Since the bottom of the side surface is spaced from the top surface and was otherwise exposed to ambient, it retained a relatively lower, but still elevated, temperature (intermediate between the top surface and background temperatures). As shown in FIG. 10C, the temperature of the top surface and bottom of the side surface quickly rose to about 40° C. within the first 2 minutes. Such rapid temperature rise can facilitate release of the water from the foam via evaporation. At first, the water stored near the surface evaporates. Meanwhile, the water in the center and bottom of the foam replenishes the vacant pores near the surface through the interconnected channels and pores of the foam. After 1 hour of irradiation, about 95% of the water evaporates from the foam.

Figure 10E:
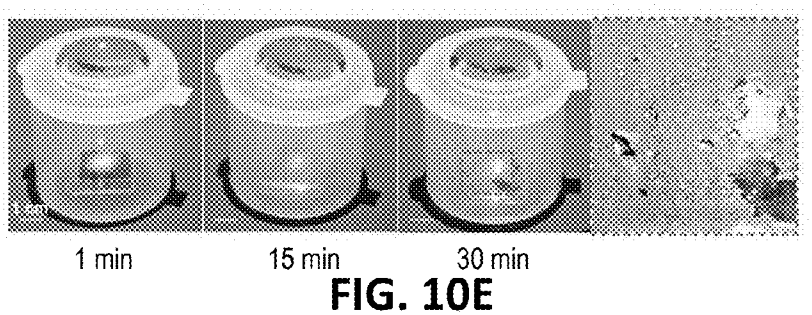
FIG. 10E shows images of a setup employing an LiCl@CGNFC foam at different times during exposure to sunlight.

To demonstrate water harvesting in a natural environment, an LiCl@CGNFC foam was integrated with a plastic container and a magnifying lens to serve as a water harvesting device, as shown in FIG. 10E. During the water uptake phase, the lid of the container was left open so that the foam can absorb the atmospheric water. During the water release phase, the container was sealed so that the magnifying lens concentrates sunlight to heat the foam and evaporate water therefrom. The container provided surfaces for water vapor condensation and collection of the obtained liquid water. Exposed to sunlight irradiation, the foam converted the sunlight into thermal energy, leading to the temperature increase of the foam and absorbed water, and thus evaporating water from the foam. When the water vapor in the sealed container reaches saturation at a particular temperature, the vapor liquefies and condenses to form small water droplets on the inner surfaces of the container (e.g., as shown in the rightmost panel of FIG. 10E). Small water droplets merge into larger water droplets and finally flow down along the wall under the effect of gravity.

Figure 10F:
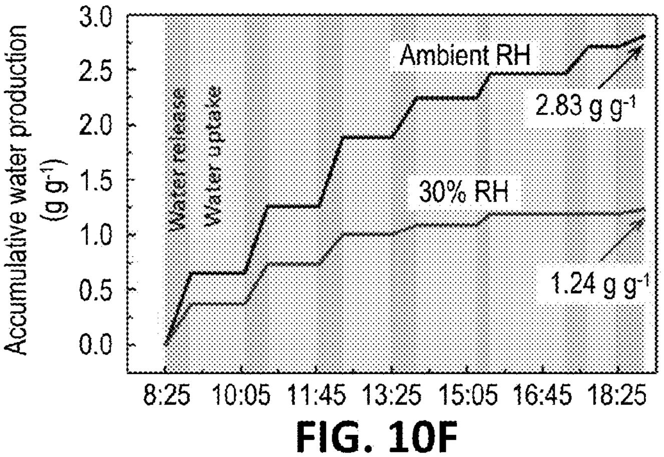
FIG. 10F is a graph comparing accumulated water production for the device of FIG. 10E at ambient relative humidity and at 30% relative humidity.

The daily water production of the device was characterized under ambient conditions at 38.99° N, 76.94° W, 2 meter elevation, in particular, temperatures in a range of 27.2-37.9° C., RH in a range of 32-66%, and solar irradiation intensities in a range of 28.8-130.1 kLx. Experiments were performed at 30% RH (arid environment) and ambient RH (non-arid environment) for seven cycles, the results of which are shown in FIG. 10F. The AWH device employing the LiCl@CGNFC foam demonstrated a remarkable daily water production of 1.24 g/g per day (arid environment, 30% RH) and 2.83 g/g per day (non-arid environment, 30%-60% RH), which other known AWH devices and materials.

Since the LiCl@CGNFC foam is formed of carbonized NFC, graphite, and LiCl, it can be more environmentally friendly than other AWH materials, such as MOF. To demonstrate the low environmental impacts of the LiCl@CGNFC foam, seed germination toxicity tests were performed. In each test set, two cilantro seeds were buried in soil together with a piece of LiCl@CGNFC foam (13 mm×8 mm×5 mm in size) in proximity. Five such test sets were carried out at the same time. Under regular sunlight and with appropriate water irrigation, all ten seeds germinated successfully and ultimately grew up as healthy cilantro plants with heights in a range of 10-70 cm after two months. The roots of the mature cilantro plant wrapped around the LiCl@CGNFC foam buried nearby. Further examination by digging out the foam piece and cleaning the soil revealed that the cilantro plant roots penetrated through the foam in multiple places. For control experiments, the same seed germination tests were carried out in natural soil without any composite foam. The germination process and growing status of the cilantro plants in natural soil in the control experiment was comparable to those of the plants with composite foams present, suggesting that the LiCl@CGNFC foam poses no appreciable negative impacts on the germination and growth of cilantro plants and thus can be considered eco-friendly.

Figure 11:
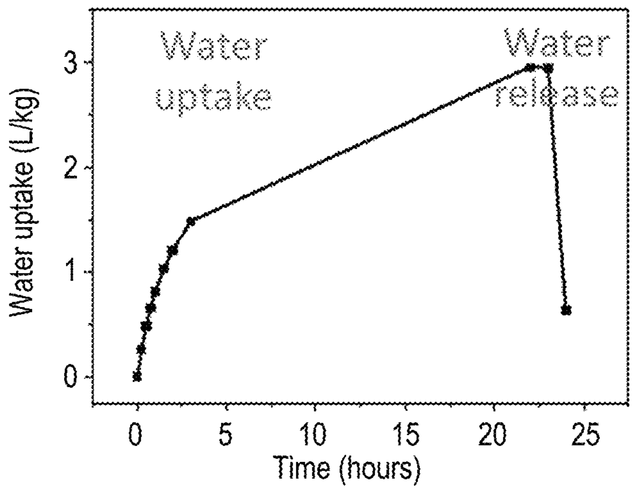
FIG. 11 is a graph showing the water harvesting performance (uptake followed by release) of an AWH composite fabricated from a synthetic polymer foam.

Although the above examples are directed to CGNFC foam, foam formed from an organic polymer could instead be used as a base material into which deliquescent materials, water soluble polymers, and carbon materials could be loaded. In a fabricated example, carbon and deliquescent material were combined with soluble polymers in solution and subjected to sonication to form a carbon dispersion. The organic polymer foam was then soaked in the solution and subsequently freeze-dried to form the composite foam. The resulting composite foam was able to absorb water over 294% of its weight from an atmosphere at 90% relative humidity (RH) and to quickly release 85% of absorbed water after only an hour of solar irradiation, as shown in FIG. 11. The composite foam was also capable of daily water production of 2.65 g/g/day in a humid environment (90% RH), which also outperforms existing absorbent materials. The composite foam is also non-toxic, promising a feasible and efficient green solution to AWH. Moreover, since the composite foam was made via an aqueous process without use of any organic solvent, the fabrication may be simpler and more environmentally friendly than conventional processes.

CONCLUSION

Any of the features illustrated or described herein, for example, with respect to FIGS. 1-11, can be combined with any other feature illustrated or described herein, for example, with respect to FIGS. 1-11 to provide systems, devices, structures, materials, methods, and embodiments not otherwise illustrated or specifically described herein. All features described herein are independent of one another and, except where structurally impossible, can be used in combination with any other feature described herein. In view of the many possible embodiments to which the principles of the disclosed technology may be applied, it should be recognized that the illustrated embodiments are only examples and should not be taken as limiting the scope of the disclosed technology. Rather, the scope is defined by the following claims. We therefore claim all that comes within the scope and spirit of these claims.

The invention claimed is:

1. A system comprising:

an atmospheric water harvesting (AWH) composite comprising:

a foam comprising an organic polymer, the foam having pore size of at least 1 μm; and a plurality of deliquescent particles disposed on internal surfaces of the foam, wherein the plurality of deliquescent particles is formed of one or more hygroscopic materials, and some of the deliquescent particles are nanoparticles having a size less than or equal to 500 nm, and others of the deliquescent particles form a dendritic structure having a size greater than or equal to 1 μm.

2. The system of claim 1, wherein the pore size of the foam is in a range of 25-500 μm, inclusive.

3. The system of claim 1, wherein the AWH composite further comprises a plurality of water-soluble polymer particles disposed on the internal surfaces of the foam.

4. The system of claim 1, wherein the AWH composite further comprises a plurality of carbon-based particles disposed on the internal surfaces of the foam.

5. The system of claim 1, wherein the foam has been carbonized.

6. The system of claim 1, further comprising:

a water bottle, wherein the AWH composite is configured to be inserted into the water bottle, and the water bottle comprises:

a heating system configured to heat the AWH composite within the water bottle or a refrigeration system configured to cool at least part of the water bottle; and an electrical power source operatively coupled to the heating or refrigeration system.

7. A method comprising:

immersing at least part of a foam in a solution comprising a plurality of deliquescent particles, the plurality of deliquescent particles being formed of one or more hygroscopic materials, the foam comprising an organic polymer and having a pore size of at least 1 μm; and after the immersing, drying the foam to form an atmospheric water harvesting (AWH) composite, wherein, after the drying, the plurality of deliquescent particles are disposed on internal surfaces of the foam.

8. The method of claim 7, wherein, after the drying, some of the deliquescent particles are formed as nanoparticles having a size less than or equal to 500 nm, and others of the deliquescent particles form a dendritic structure having a size greater than or equal to 1 μm.

9. The method of claim 7, wherein, during the immersing, the pore size of the foam is in a range of 25-500 μm, inclusive.

10. The method of claim 7, wherein the solution further comprises a water-soluble polymer, and the AWH composite further comprises a plurality of particles formed of the water-soluble polymer disposed on the internal surfaces of the foam.

11. The method of claim 7, wherein the solution further comprises carbon-based particles, and the AWH composite further comprises a plurality of the carbon-based particles on the internal surfaces of the foam.

12. The method of claim 7, wherein:

the organic polymer comprises nano-fibrillated cellulose (NFC);

the foam further comprises graphite; and the method further comprises, prior to the immersing:

combining 2,2,6,6-tetramethylpiperidine (TEMPO) oxidized NFC with graphite flakes in solution;

subjecting the solution of NFC and graphite to ultrasonication to form a slurry;

casting the slurry into a predetermined shape; and drying the cast slurry to form the foam.

13. The method of claim 12, further comprising, after the drying to form the foam and prior to the immersing, heating the foam to carbonize at least a portion thereof.

14. A method comprising:

providing an atmospheric water harvesting (AWH) composite in an atmosphere having a relative humidity, such that water in the atmosphere is captured by the AWH composite; and after the providing, releasing the captured water from the AWH composite by heating the AWH composite, wherein the AWH composite comprises a foam and a plurality of deliquescent particles, the foam comprises an organic polymer and has a pore size of at least 1 μm, some of the deliquescent particles are nanoparticles having a size less than or equal to 500 nm, and others of the deliquescent particles form a dendritic structure having a size greater than or equal to 1 μm, and the plurality of deliquescent particles is disposed on internal surfaces of the foam and is formed of one or more hygroscopic materials.

15. The method of claim 14, wherein:

the heating comprises directing solar radiation onto the AWH composite;

the heating comprises heating by a fire; or the heating comprises using a heating system thermally coupled to the AWH composite to increase a temperature of the AWH composite.

16. The method of claim 14, further comprising:

cooling at least a portion of a container in which the AWH composite is disposed using a refrigeration system thermally coupled to the container so as to condense the released water.

17. The method of claim 14, further comprising:

after the providing and prior to the releasing, inserting the AWH composite into a portable water bottle or other fluid container.

18. The method of claim 14, wherein the providing and the releasing are such that the AWH composite:

absorbs at least 100% of its weight in water at 90% relative humidity;

provides a water uptake capacity at saturation of at least 0.9 g/g at 30% relative humidity;

provides a water uptake speed of at least 0.2 g/g per hour at 30% relative humidity; or any combination of the foregoing.

19. A system comprising:

an atmospheric water harvesting (AWH) composite comprising:

a foam comprising an organic polymer, the foam having pore size of at least 1 μm; and a plurality of deliquescent particles disposed on internal surfaces of the foam, wherein the plurality of deliquescent particles is formed of one or more hygroscopic materials, and the foam has been carbonized.

20. A method comprising:

providing an atmospheric water harvesting (AWH) composite in an atmosphere having a relative humidity, such that water in the atmosphere is captured by the AWH composite; and after the providing, releasing the captured water from the AWH composite by heating the AWH composite, wherein the AWH composite comprises a foam and plurality of deliquescent particles, the foam comprises an organic polymer and has a pore size of at least 1 μm, the plurality of deliquescent particles is disposed on internal surfaces of the foam and is formed of one or more hygroscopic materials, and the foam has been carbonized.

* * * * *